(12) United States Patent
Yang et al.

(10) Patent No.: US 11,438,811 B2
(45) Date of Patent: *Sep. 6, 2022

(54) NEXT GENERATION NODE-B (GNB) AND METHODS FOR MOBILITY MANAGEMENT WITH SEPARATE USER PLANE AND CONTROL PLANE IN NEW RADIO (NR) SYSTEMS

(71) Applicant: Apple Inc., Cupertino, CA (US)

(72) Inventors: Feng Yang, Beijing (CN); Min Huang, Beijing (CN); Alexander Sirotkin, Tel-Aviv (IL); Xu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,106

(22) Filed: Feb. 22, 2021

(65) Prior Publication Data

US 2021/0176676 A1 Jun. 10, 2021

Related U.S. Application Data

(63) Continuation of application No. 16/141,440, filed on Sep. 25, 2018, now Pat. No. 10,932,168.

(51) Int. Cl.
*H04W 36/00* (2009.01)
*H04W 88/16* (2009.01)
(Continued)

(52) U.S. Cl.
CPC ... *H04W 36/0066* (2013.01); *H04W 36/0033* (2013.01); *H04W 36/0055* (2013.01);
(Continued)

(58) Field of Classification Search
CPC ......... H04W 36/0066; H04W 36/0033; H04W 36/0083; H04W 36/023; H04W 88/16; H04W 84/045
See application file for complete search history.

(56) References Cited

U.S. PATENT DOCUMENTS 10,306,526 B2 * 5/2019 Oak .................. H04W 36/0055
10,736,008 B2 * 8/2020 Oak ...................... H04W 36/08
(Continued)

FOREIGN PATENT DOCUMENTS

WO WO-2009021214 A2 * 2/2009 ............. H04L 47/10

OTHER PUBLICATIONS

"New SID on Separation of CP and UP for split option 2", 3GPP TSG RAN Meeting #76 RP-171421, (Jun. 2017), 4 pgs.
(Continued)

*Primary Examiner* — Mounir Moutaouakil
(74) *Attorney, Agent, or Firm* — Kowert, Hood, Munyon, Rankin & Goetzel, P.C.

(57) ABSTRACT

Embodiments of a Next Generation Node-B (gNB) and methods of communication are disclosed herein. The gNB may be configurable to operate as a source gNB (S-gNB). The S-gNB may transfer, from a control plane (CU-CP) of the S-gNB to a CU-CP of a target gNB (T-gNB), an XnAP handover request message that indicates an Xn handover of a User Equipment (UE) from the S-gNB to the T-gNB. The S-gNB may initiate data forwarding, from a user plane (CU-UP) of the S-gNB to a CU-UP of the T-gNB, of downlink data packets. The data forwarding may be terminated based on reception of end marker packets from a user plane function (UPF) entity. The CU-UP of the S-gNB may transfer end marker packets to the CU-UP of the S-gNB to indicate termination of the data forwarding.

20 Claims, 12 Drawing Sheets

(51) Int. Cl.
*H04W 84/04* (2009.01)
*H04W 36/02* (2009.01)
*H04W 88/08* (2009.01)

(52) U.S. Cl.
CPC ...... *H04W 36/0083* (2013.01); *H04W 36/023* (2013.01); *H04W 84/045* (2013.01); *H04W 88/085* (2013.01); *H04W 88/16* (2013.01)

(56) References Cited

U.S. PATENT DOCUMENTS

| | | | |
|---|---|---|---|
| 2009/0124259 A1* | 5/2009 | Attar | H04L 47/10 455/436 |
| 2011/0211559 A1* | 9/2011 | Lim | H04W 36/02 370/331 |
| 2016/0112922 A1 | 4/2016 | Han et al. | |
| 2016/0249259 A1 | 8/2016 | Park et al. | |
| 2019/0089579 A1* | 3/2019 | Sang | H04W 76/27 |
| 2019/0174561 A1* | 6/2019 | Sivavakeesar | H04W 48/12 |
| 2019/0182211 A1 | 6/2019 | Yang et al. | |
| 2019/0222291 A1* | 7/2019 | Wang | H04W 88/085 |
| 2019/0313296 A1* | 10/2019 | Yiu | H04W 36/38 |
| 2020/0029389 A1 | 1/2020 | Yilmaz et al. | |
| 2020/0029390 A1 | 1/2020 | Han et al. | |
| 2020/0120572 A1* | 4/2020 | Fiorani | H04W 36/06 |

OTHER PUBLICATIONS

ZTE, Discussion on Multiple CU-UPs impacton NG interface, 3GPP TSG RAN WG3 NR#100 R3-182863, Busan, 3 pages, Korea, May 21- 25, 2018 (Year: 2018).

Ericsson, (TP for CPUP Split BL CR for TS 38.401): Support of keeping the DL UP termination point on the RAN-CN interface at inter-RAN node bearer mobility—E1 aspects, 3GPP TSG-RAN WG3 Meeting #100 Tdoc R3-18275, Busan, Korea, May 21-25, 2017.

Ericsson, Introducing SN initiated SN Change procedure in XnAP, 3GPP TSG-RAN WG3 Meeting #100 R3-182746, Busan, Korea, May 21-25, 2018 (Year: 2018).

3GPP, 3rd Generation Partnership Project; Technical Specification Group Radio Access Network; Evolved Universal Terrestrial x Radio Access Network (E-UTRAN) and Wireless Local Area Network (WLAN); Xw application protocol (XwAP); 3GPP TS 36.463 V14.2.0 (Jun. 2017) (Year: 2017).

* cited by examiner

NEXT GENERATION NODE-B (GNB) AND METHODS FOR MOBILITY MANAGEMENT WITH SEPARATE USER PLANE AND CONTROL PLANE IN NEW RADIO (NR) SYSTEMS

PRIORITY CLAIM

This application is a continuation of U.S. patent application Ser. No. 16/141,440, filed Sep. 25, 2018, which claims priority under 35 USC 119(e) to PCT Patent Application No. PCT/CN2017/104309, filed Sep. 29, 2017, which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to paging of mobile devices. Some embodiments relate to disaggregated base stations, including disaggregated Next Generation Node-B (gNB) devices. Some embodiments relate to handover.

BACKGROUND

A mobile device may communicate with a base station to exchange data. In an example scenario, the mobile device may communicate with a disaggregated base station that may include various components. For instance, those components may include a centralized control unit and a distributed unit. In some scenarios, a handover of the mobile device may be performed, which may be challenging. For instance, undesirable effects such as lost packets or congestion of interfaces with control messages may occur during a handover. Those effects and others may be exacerbated when a disaggregated base station is involved, in some cases. Accordingly, there is a general need for methods and systems to enable communication between the mobile device and the base station in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
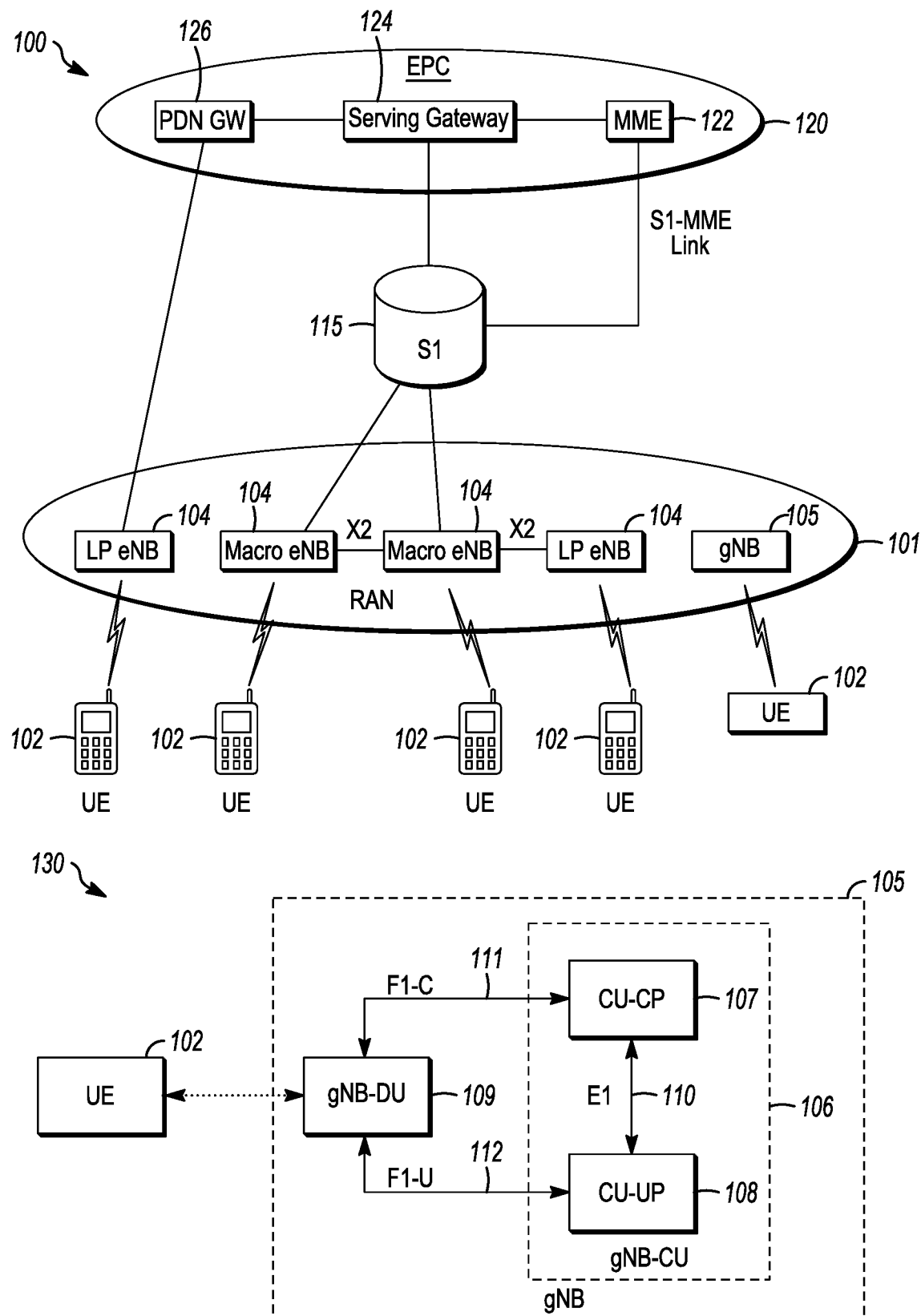
FIG. 1A is a functional diagram of an example network in accordance with some embodiments.
Figure 1B:
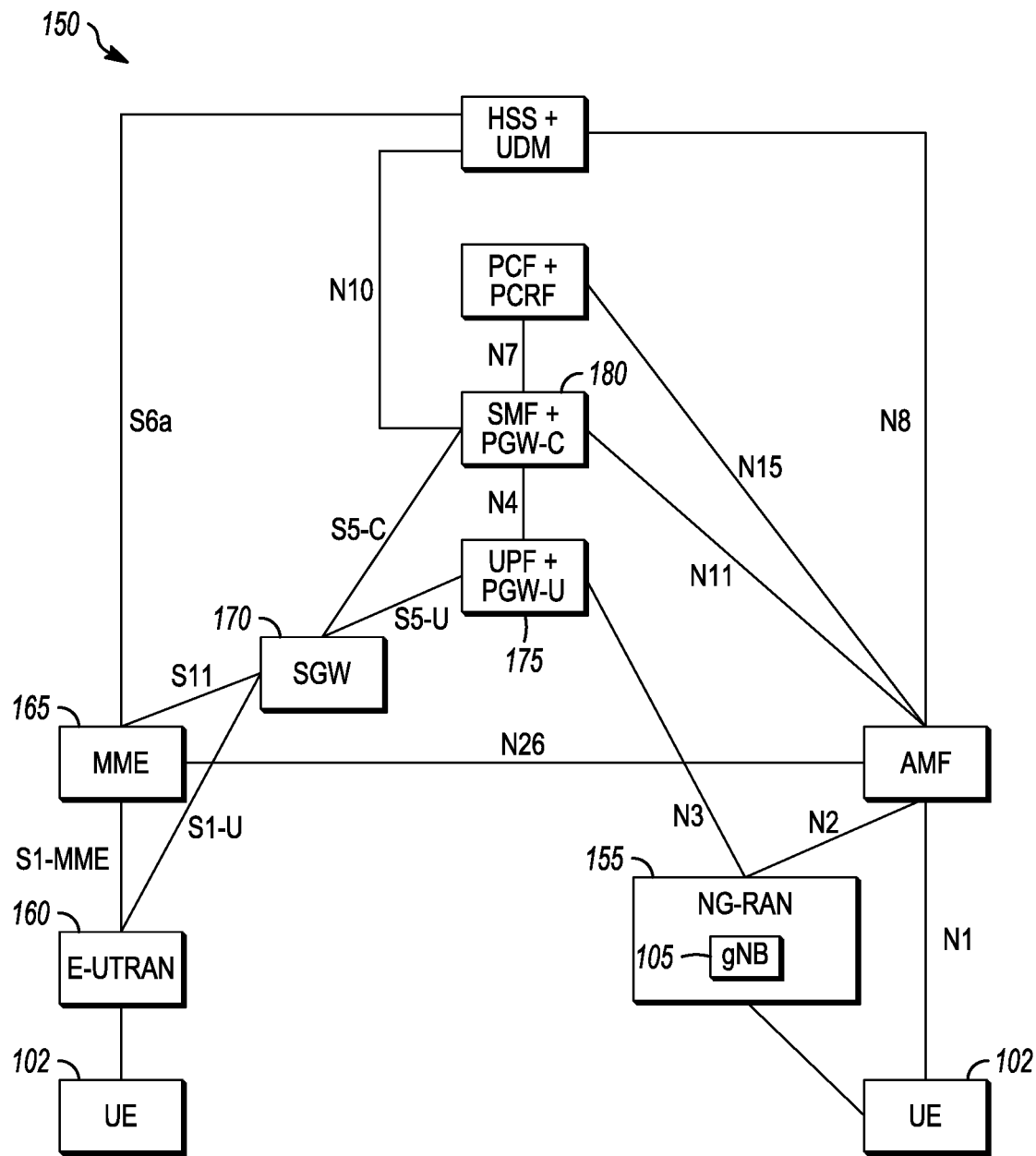
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, the gNB 105 may include multiple components. In a non-limiting example shown in 130, the gNB 105 may comprise a gNB central unit (gNB-CU) 106 and a gNB distributed unit (gNB-DU) 109. Embodiments are not limited to the number of components shown, as the gNB 105 may include multiple gNB-CUs 106 and/or multiple gNB-DUs 109, in some embodiments. In some embodiments, the gNB-CU 106 may include a control unit user-plane (CU-UP) entity 108 and a control unit control-plane (CU-CP) 107. Embodiments are not limited to the number of components shown, as the gNB-CU 106 may include multiple CU-CPs 107 and/or multiple CU-UPs 108, in some embodiments. In some embodiments, the CU-CP 107 and the CU-UP 108 may communicate over the E1 interface 110, although the scope of embodiments is not limited in this respect. In some embodiments, the gNB-CU 106 and the gNB-DU 109 may communicate over an F1 interface, although the scope of embodiments is not limited in this respect. In some embodiments, the F1 interface may include an F1-C interface 111 and an F1-U interface 112, although the scope of embodiments is not limited in this respect. In some embodiments, the CU-CP 107 and the gNB-DU 109 may communicate over the F1-C interface 111, although the scope of embodiments is not limited in this respect. In some embodiments, the CU-UP 108 and the gNB-DU 109 may communicate over the F1-U interface 112, although the scope of embodiments is not limited in this respect.

In some embodiments, the gNB-CU 106 and the gNB-DU 109 may be part of a disaggregated gNB 105. One or more of the gNB-CU 106, CU-CP 107, CU-UP 108, gNB-DU 109 may be co-located, in some embodiments. One or more of the gNB-CU 106, CU-CP 107, CU-UP 108, gNB-DU 109 may not necessarily be co-located, in some embodiments. Other arrangements are possible, including arrangements in which two or more of the gNB-CU 106, CU-CP 107, CU-UP 108, gNB-DU 109 are co-located.

The scope of embodiments is not limited to arrangements in which the gNB-CU 106 and the gNB-DU 109 are part of a disaggregated gNB 105, however. In some embodiments, one or more of the techniques, operations and/or methods described herein may be practiced by a gNB-CU 106, CU-CP 107, CU-UP 108 and/or gNB-DU 109 that may not necessarily be included in a disaggregated gNB 105.

References herein to communication between the gNB 105 and another component (such as the UE 102, MME 122, SGW 124 and/or other) are not limiting. In some embodiments, such communication may be performed between the component (such as the UE 102, MME 122, SGW 124 and/or other) and one of the gNB-CU 106, CU-CP 107, CU-UP 108, gNB-DU 109.

References herein to an operation, technique and/or method performed by the gNB 105 are not limiting. In some embodiments, such an operation, technique and/or method may be performed by one of the gNB-CU 106, CU-CP 107, CU-UP 108, gNB-DU 109.

In some embodiments, one or more of the UEs 102, gNBs 105, gNB-CU 106, CU-CP 107, CU-UP 108, gNB-DU 109, and/or eNBs 104 may be configured to operate in accordance with an NR protocol and/or NR techniques. References to a UE 102, eNB 104, gNB 105, gNB-CU 106, CU-CP 107, CU-UP 108 and/or gNB-DU 109 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below. In some embodiments, the UE 102 may transmit signals to a component of a disaggregated gNB 105 (such as the gNB-DU 109). In some embodiments, the UE 102 may receive signals from a component of a disaggregated gNB 105 (such as the gNB-DU 109).

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 175, 180 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
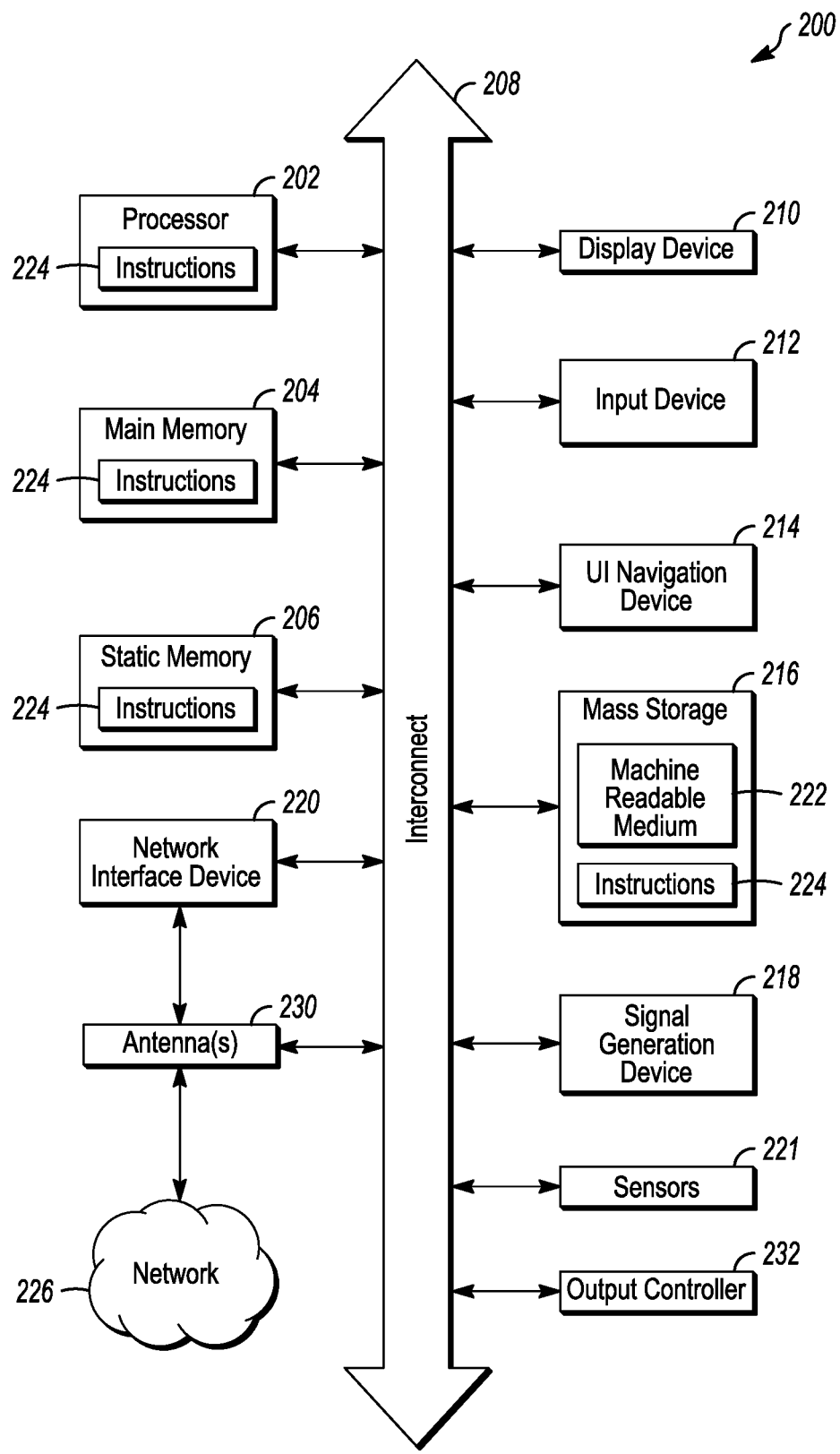
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, gNB-CU 106, CU-CP 107, CU-UP 108, gNB-DU 109, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
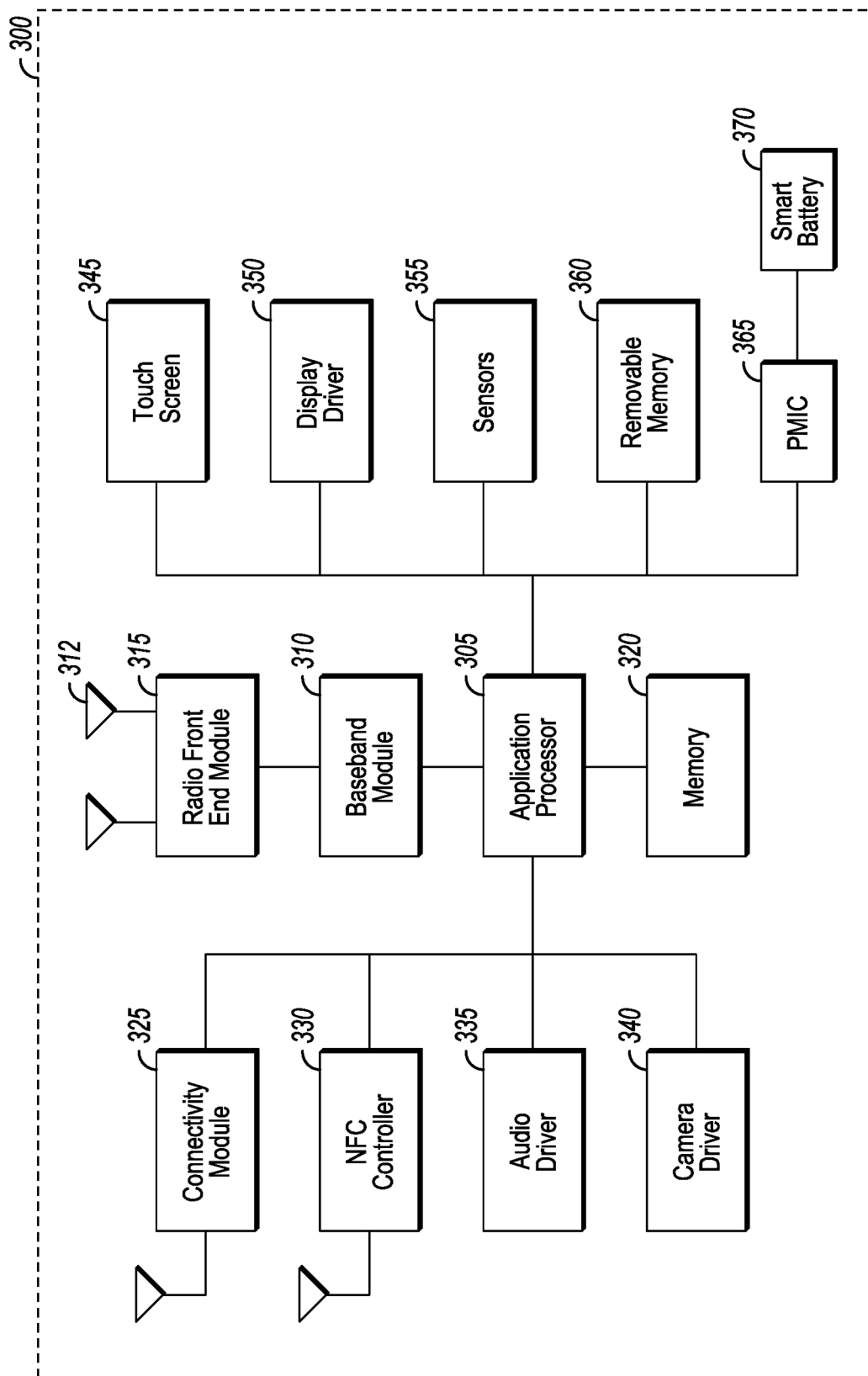
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
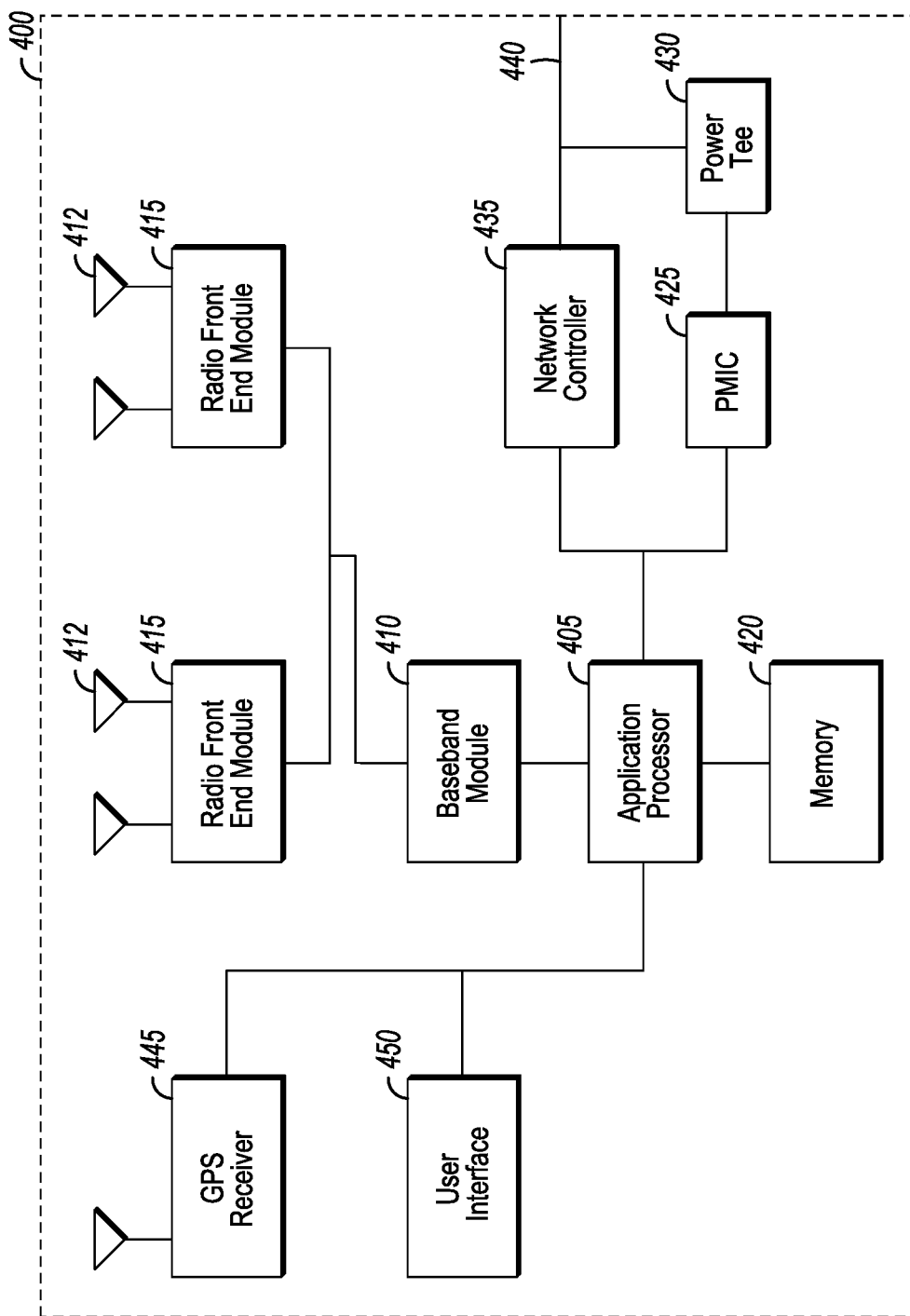
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a gNB-CU 106, an apparatus of a gNB-CU 106, a CU-CP 107, an apparatus of a CU-CP 107, a CU-CU 108, an apparatus of a CU-CU 108, a gNB-DU 109 an apparatus of a gNB-DU 109, a base station and/or an apparatus of a base station may include one or more of the components shown in one or more of FIGS. 2, 4, and 5. In some embodiments, such an eNB 104, gNB 105, gNB-CU 106, CU-CP 107, CU-UP 108, gNB-DU 109, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
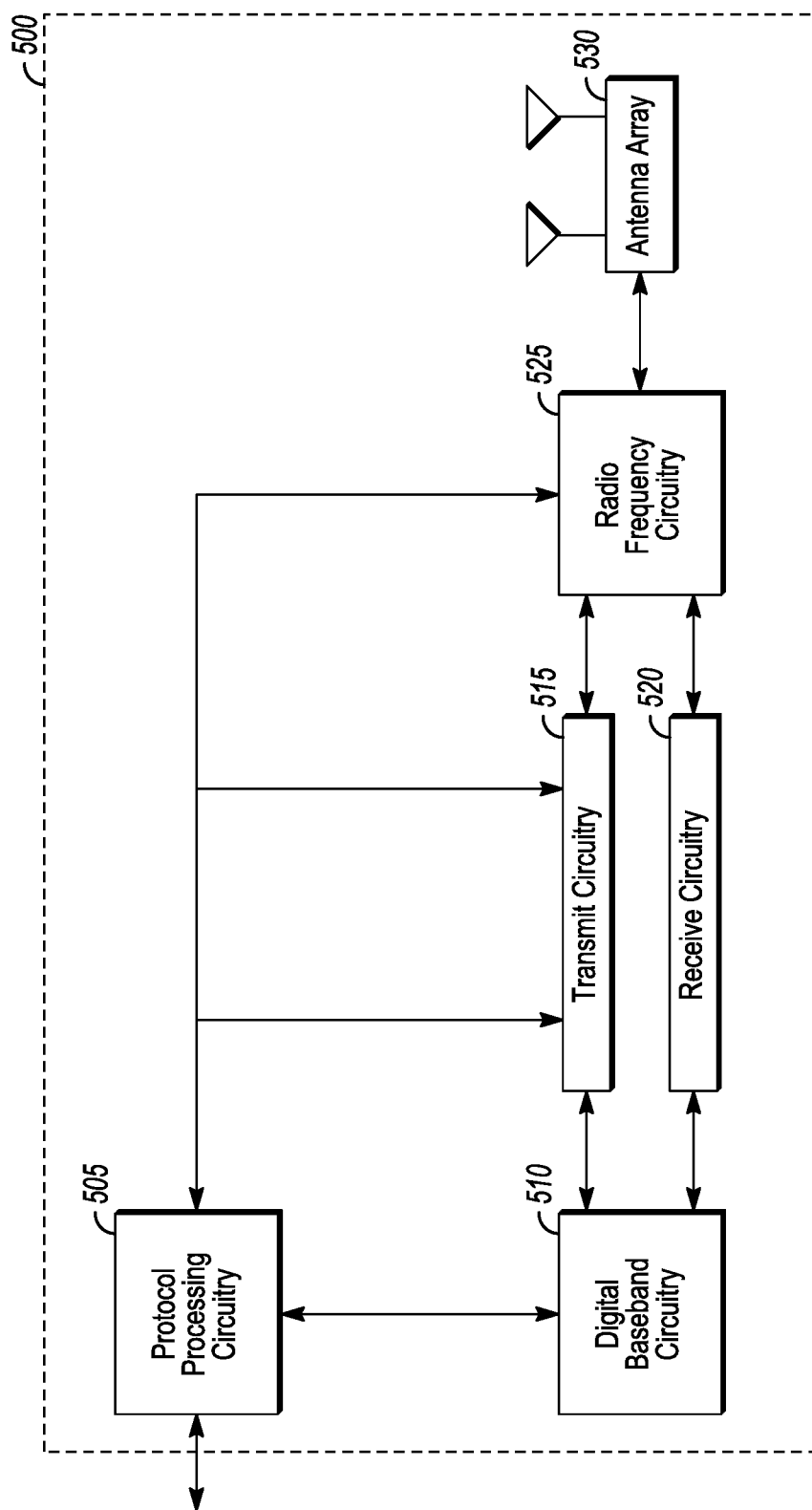
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, gNB-CU 106, CU-CP 107, CU-UP 108, gNB-DU 109, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, gNB-CU 106, CU-CP 107, CU-UP 108, gNB-DU 109, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, gNB-CU 106, CU-CP 107, CU-UP 108, gNB-DU 109, user device 300, base station 400, machine 200 and/or other device described herein may be configured to operate in accordance with 3GPP standards, although the scope of the embodiments is not limited in this respect. In some embodiments, the UE 102, eNB 104, gNB 105, gNB-CU 106, CU-CP 107, CU-UP 108, gNB-DU 109, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, gNB-CU 106, CU-CP 107, CU-UP 108, gNB-DU 109, user device 300, base station 400, machine 200 and/or other device described herein may be configured to operate according to other protocols or standards, including IEEE 802.11 or other IEEE standards. In some embodiments, the UE 102, eNB 104, gNB 105, gNB-CU 106, CU-CP 107, CU-UP 108, gNB-DU 109, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, gNB-CU 106, CU-CP 107, CU-UP 108, gNB-DU 109, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, gNB-CU 106, CU-CP 107, CU-UP 108, gNB-DU 109, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB. In addition, techniques and operations described herein that refer to the gNB-CU 106, may be applicable to an apparatus of a gNB-CU. In addition, techniques and operations described herein that refer to the CU-CP 107 may be applicable to an apparatus of a CU-CP. In addition, techniques and operations described herein that refer to the CU-UP 108 may be applicable to an apparatus of a CU-UP. In addition, techniques and operations described herein that refer to the gNB-DU 109 may be applicable to an apparatus of a gNB-DU.

It should be noted that some of the descriptions herein may refer to performance of operations, methods and/or techniques by elements such as the gNB 105, gNB-CU 106, CU-CP 107, CU-UP 108 and/or gNB-DU 109. Such references are not limiting, however. One or more of the operations, methods and/or techniques may be performed by one or more other entities, in some embodiments.

In accordance with some embodiments, a gNB 105 may be configurable to operate as a source gNB (S-gNB) 105. The S-gNB 105 may be configured with logical nodes including a gNB central unit (gNB-CU) 106 and a gNB distributed unit (gNB-DU) 109. The gNB-CU 106 may comprise a control plane (CU-CP) 107 for control-plane functionality, and a user plane (CU-UP) 108 for user-plane functionality. The S-gNB 105 may encode an XnAP handover request message for transfer by the CU-CP 107 of the S-gNB 105 to a CU-CP 107 of a target gNB (T-gNB) 105. The XnAP handover request message may indicate an Xn handover of a UE 102 from the S-gNB 105 to the T-gNB 105. The S-gNB 105 may initiate data forwarding, from the CU-UP 108 of the S-gNB 105 to a CU-UP 108 of the T-gNB 105, of downlink data packets intended for the UE 102. The S-gNB 105 may decode, at the CU-UP 108 of the S-gNB 105 a first end marker packet that indicates that the CU-UP 108 of the S-gNB 105 is to terminate the data forwarding, the first end marker packet received from a user plane function (UPF) entity that exchanges data with the S-gNB 105. The S-gNB 105 may encode, for transfer from the CU-UP 108 of the S-gNB 105 to the CU-UP 108 of the T-gNB 105, a second end marker packet that indicates termination of the data forwarding. These embodiments are described in more detail below.

Figure 6:
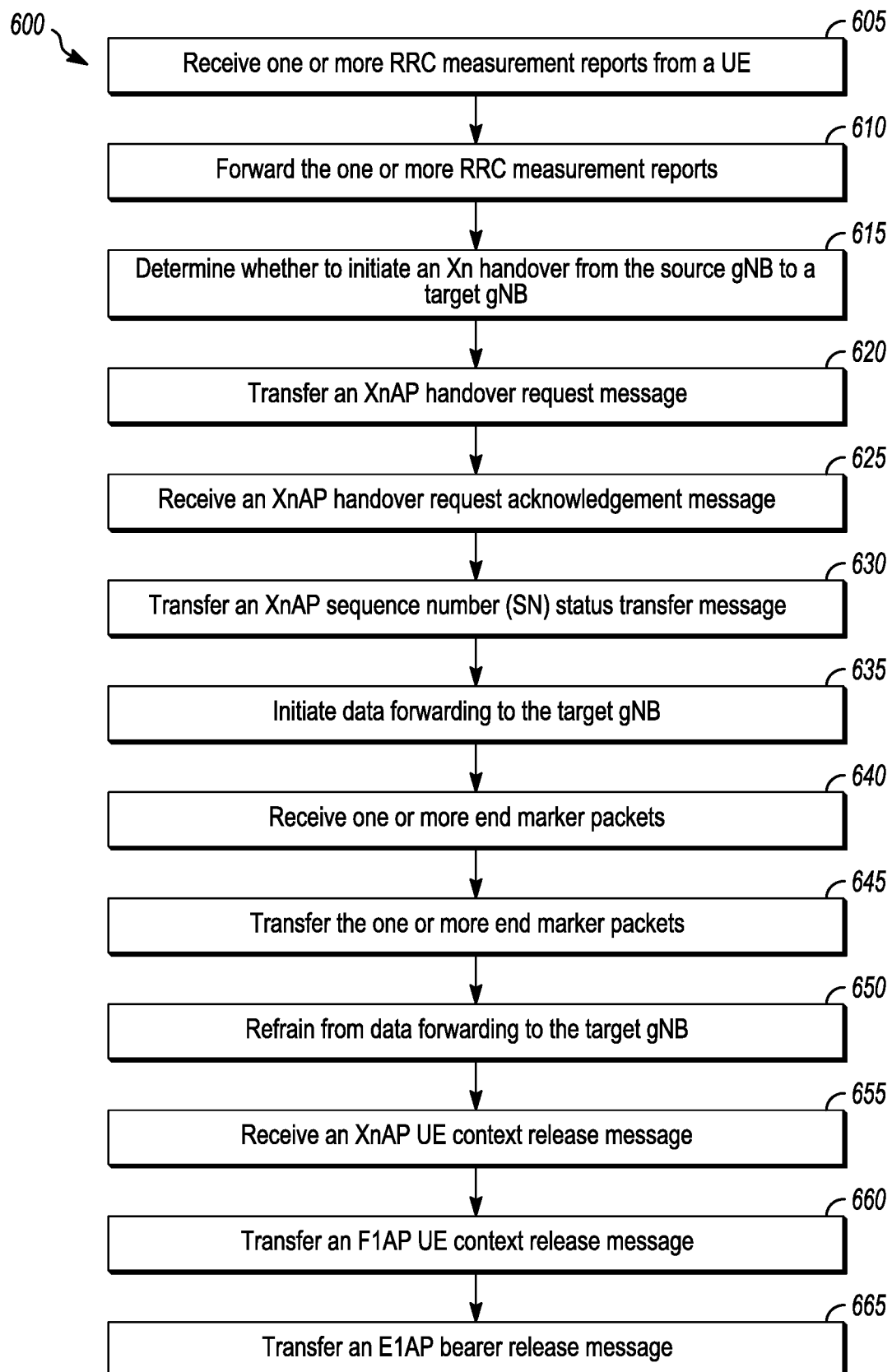
FIG. 6 illustrates the operation of a method of communication in accordance with some embodiments.
Figure 7:
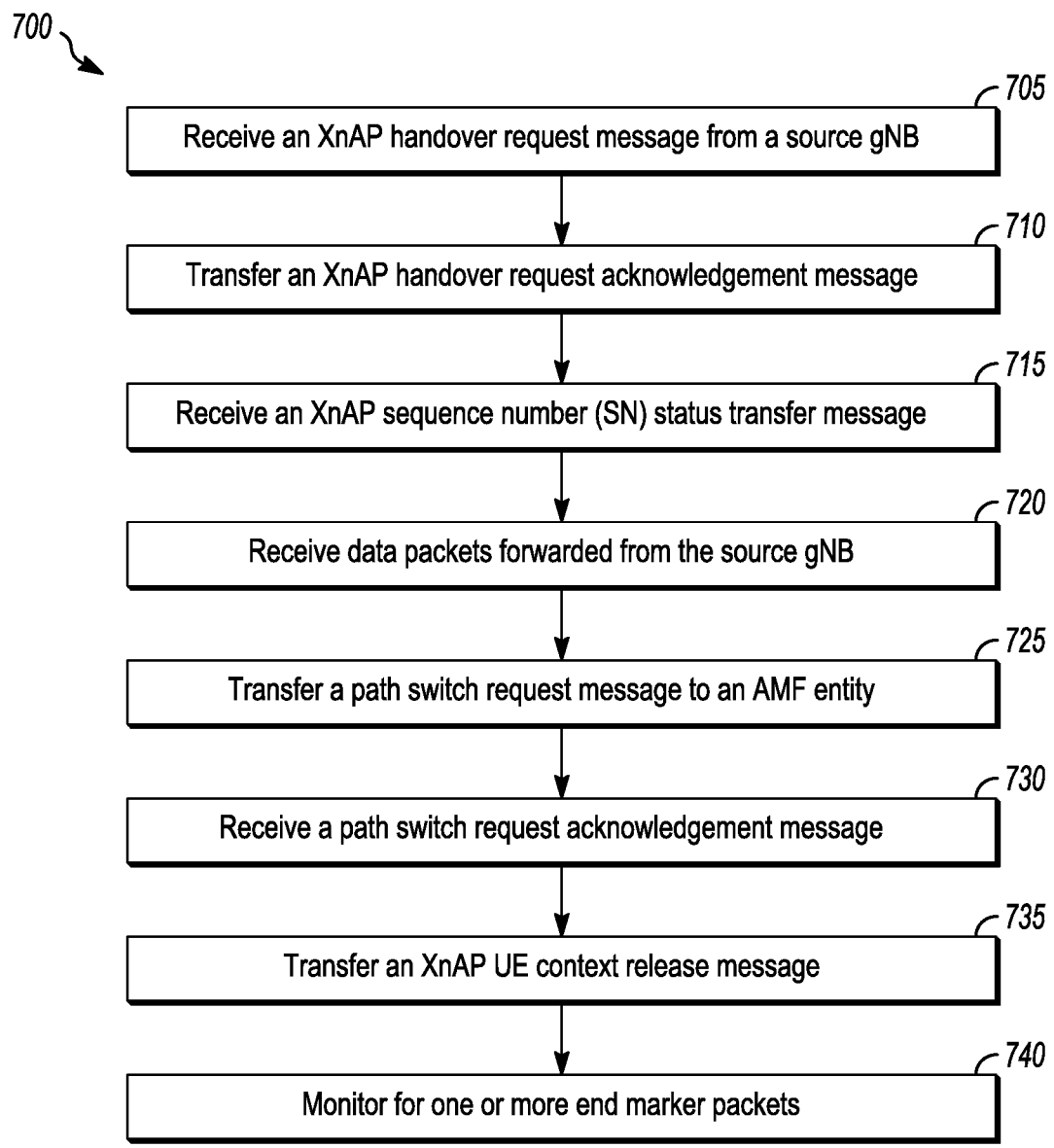
FIG. 7 illustrates the operation of another method of communication in accordance with some embodiments.

FIG. 6 illustrates the operation of a method of communication in accordance with some embodiments. FIG. 7 illustrates the operation of another method of communication in accordance with some embodiments. It is important to note that embodiments of the methods 600, 700 may include additional or even fewer operations or processes in comparison to what is illustrated in FIGS. 6-7. In addition, embodiments of the methods 600, 700 are not necessarily limited to the chronological order that is shown in FIGS. 6-7. In describing the methods 600, 700, reference may be made to one or more figures, although it is understood that the methods 600, 700 may be practiced with any other suitable systems, interfaces and components.

In some embodiments, a gNB 105 may perform one or more operations of the method 600, but embodiments are not limited to performance of the method 600 and/or operations of it by the gNB 105. In some embodiments, another device and/or component (including but not limited to the gNB-CU 106, CU-CP 107, CU-UP 108, gNB-DU 109 and/or an eNB 104) may perform one or more operations of the method 600. In some embodiments, a source gNB 105 and/or gNB 105 configurable to operate as a source gNB 105 may perform one or more operations of the method 600, although the scope of embodiments is not limited in this respect.

In some embodiments, a gNB 105 may perform one or more operations of the method 700, but embodiments are not limited to performance of the method 700 and/or operations of it by the gNB 105. In some embodiments, another device and/or component (including but not limited to the gNB-CU 106, CU-CP 107, CU-UP 108, gNB-DU 109 and/or an eNB 104) may perform one or more operations of the method 700. In some embodiments, a target gNB 105 and/or gNB 105 configurable to operate as a target gNB 105 may perform one or more operations of the method 700, although the scope of embodiments is not limited in this respect.

In some embodiments, the gNB 105 may be configurable to operate as a source gNB 105 (S-gNB). In some embodiments, the gNB 105 may be configurable to operate as a target gNB 105 (T-gNB). In some embodiments, the gNB 105 may be configurable to operate as an S-gNB and/or T-gNB. In some embodiments, a gNB 105 may perform one or more operations of the method 600 (as a source gNB 105) and may perform one or more operations of the method 700 (as a target gNB 105).

In a non-limiting example, a handover of a first UE 102 from a gNB 105 may be performed and a handover of a second UE 102 to the gNB 105 may be performed. Accordingly, the gNB 105 may operate as a source gNB 105 for the handover of the first UE 102 and may operate as a target gNB 105 for the handover of the second UE 102.

References herein to a "source gNB" and/or "target gNB" may be used for clarity, but such references are not limiting. For instance, in descriptions herein, the operations of the method 600 may be performed by an S-gNB 105, but it is understood that a gNB 105 and/or other component may perform one or more operations of the method 600. In addition, in descriptions herein, the operations of the method 700 may be performed by a T-gNB 105, but it is understood that a gNB 105 and/or other component may perform one or more operations of the method 700.

It should be noted that one or more operations of one of the methods 600, 700 may be the same as, similar to and/or reciprocal to one or more operations of the other method. For instance, an operation of the method 600 may be the same as, similar to and/or reciprocal to an operation of the method 700, in some embodiments. In a non-limiting example, an operation of the method 600 may include reception of an element (such as a frame, block, message and/or other) by a source gNB 105, and an operation of the method 700 may include transmission of a same element (and/or similar element) by a target gNB 105. In some cases, descriptions of operations and techniques described as part of one of the methods 600, 700 may be relevant to the other method.

The methods 600, 700 and other methods described herein may refer to eNBs 104, gNBs 105, components of the gNB (such as 106-109) and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 600, 700 and other methods described herein may be practiced by wireless devices configured to operate in other suitable types of wireless communication systems, including systems configured to operate according to various IEEE standards such as IEEE 802.11.

The methods 600, 700 may also be applicable to an apparatus of a gNB 105, an apparatus of an eNB 104, an apparatus of a gNB-CU 106, an apparatus of a CU-CP 107, an apparatus of a CU-UP 108, an apparatus of a gNB-DU 109 and/or an apparatus of another device described above.

It should also be noted that embodiments are not limited by references herein (such as in descriptions of the methods 600, 700 and/or other descriptions herein) to transfer, transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transfer and/or transmission. The transfer and/or transmission may be performed by an interface, a transceiver and/or other component, in some cases. In some embodiments, such an element may be decoded, detected or otherwise processed by the processing circuitry (such as by the baseband processor). The element may be received by an interface, transceiver and/or other component, in some cases. In some embodiments, the processing circuitry and the interface may be included in a same apparatus. The scope of embodiments is not limited in this respect, however, as the interface may be separate from the apparatus that comprises the processing circuitry, in some embodiments. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of those elements, and is also not limited to usage of elements that are included in standards, however. For instance, although an operation may include usage of a message in descriptions herein, it is understood that the same operation and/or similar operation may use a different message, in some embodiments.

In some embodiments, the gNB 105 may be configurable to operate as a source gNB (S-gNB) 105. The S-gNB 105 may be configured with logical nodes, including a gNB central unit (gNB-CU) 106 and a gNB distributed unit (gNB-DU) 109. The gNB-CU 106 may comprise a control plane (CU-CP) 107 for control-plane functionality, and a user plane (CU-UP) 108 for user-plane functionality.

At operation 605, the source gNB 105 (S-gNB) may receive one or more radio resource control (RRC) measurement reports from a UE 102. In some embodiments, a gNB-DU 109 of the S-gNB 105 may receive the one or more RRC measurement reports, although the scope of embodiments is not limited in this respect. In some embodiments, the one or more RRC measurement reports may include information related to one or more signal quality measurements at the UE 102.

At operation 610, the S-gNB 105 may forward the one or more RRC measurement reports. In some embodiments, the gNB-DU 109 of the S-gNB 105 may forward the one or more RRC measurement reports to a CU-CP 107 of the S-gNB 105. Embodiments are not limited to forwarding of the RRC measurement reports, as the S-gNB 105 may transfer, from the gNB-DU 109 of the S-gNB 105 to the CU-CP 107 of the S-gNB 105, one or more elements that may include information based at least partly on the RRC measurement reports and/or signal quality measurements, in some embodiments. In some embodiments, the CU-CP 107 of the S-gNB 105 may receive the one or more RRC measurement reports from the gNB-DU 109.

At operation 615, the S-gNB 105 may determine whether to initiate an Xn handover from the S-gNB 105 to a target gNB 105 (T-gNB). In some embodiments, the CU-CP 107 of the S-gNB 105 may determine whether to initiate the Xn handover. In some embodiments, the CU-CP 107 of the S-gNB 105 may determine whether to initiate the Xn handover based at least party on the RRC measurement reports and/or signal quality measurements.

At operation 620, the S-gNB 105 may transfer an XnAP handover request message. In some embodiments, the S-gNB 105 may encode the XnAP handover request message for transfer by the CU-CP 107 of the S-gNB 105 to a CU-CP 107 of the T-gNB 105. In some embodiments, the XnAP handover request message may indicate an Xn handover of the UE 102 from the S-gNB 105 to the T-gNB 105.

At operation 625, the S-gNB 105 may receive an XnAP handover request acknowledgement message. In some embodiments, the CU-CP 107 of the S-gNB 105 may decode an XnAP handover request acknowledgement message that acknowledges the Xn handover of the UE 102 from the S-gNB 105 to the T-gNB 105. In some embodiments, the XnAP handover request acknowledgement message may be received from the CU-CP 107 of the T-gNB 105.

At operation 630, the S-gNB 105 may transfer an XnAP sequence number (SN) status transfer message. In some embodiments, the S-gNB 105 may encode, for transfer from the CU-CP 107 of the S-gNB 105 to the CU-CP 107 of the T-gNB 105, an XnAP SN status transfer message that indicates: an SN of a last packet data convergence protocol (PDCP) protocol data unit (PDU) successfully received from the UE 102, an SN of a last PDCP PDU transmitted to the UE 102 and/or other information. In some embodiments, the S-gNB 105 may transfer the XnAP SN status transfer message in response to reception of the XnAP handover request acknowledgement message, although the scope of embodiments is not limited in this respect.

At operation 635, the S-gNB 105 may initiate data forwarding to the T-gNB 105. In some embodiments, the S-gNB 105 may initiate data forwarding, from the CU-UP 108 of the S-gNB 105 to a CU-UP 108 of the T-gNB 105, of downlink data packets intended for the UE 102.

At operation 640, the S-gNB 105 may receive one or more end marker packets. In some embodiments, the CU-UP 108 of the S-gNB 105 may decode one or more end marker packets that indicate that the CU-UP 108 of the S-gNB 105 is to terminate the data forwarding. In some embodiments, the one or more end marker packets may be received from a user plane function (UPF) entity that exchanges data (such as transmission and/or reception of data) with the S-gNB 105.

At operation 645, the S-gNB 105 may transfer one or more end marker packets. In some embodiments, the S-gNB 105 may transfer one or more end marker packets from the CU-UP 108 of the S-gNB 105 to the CU-UP 108 of the T-gNB 105 to indicate termination of the data forwarding. Embodiments are not limited to forwarding of the end marker packets as the S-gNB 105 may transfer, from the CU-UP 108 of the S-gNB 105 to the CU-UP 108 of the T-gNB 105, one or more messages that include information based on the one or more end marker packets, some embodiments. In some embodiments, the S-gNB 105 may decode first end marker packet(s) from the UPF (at operation 640) and may transfer second end marker packet(s) from the CU-UP 108 of the S-gNB 105 to the CU-UP 108 of the T-gNB 105 (at operation 645). In a non-limiting example, the first end marker packet(s) may be different from the second end marker packet(s). For instance, the S-gNB 105 may generate the second end marker packet(s) (which may be based at least partly on information included in the first end marker packet(s)) and may transfer the second end marker packet(s) from the CU-UP 108 of the S-gNB 105 to the CU-UP 108 of the T-gNB 105. In another non-limiting example, the first end marker packet(s) may be the same as the second end marker packet(s). For instance, the S-gNB 105 may forward the first end marker packet(s) from the CU-UP 108 of the S-gNB 105 to the CU-UP 108 of the T-gNB 105.

In some embodiments, the S-gNB 105 may receive one or more end marker packets from the UPF that indicate that the CU-UP 108 of the S-gNB 105 is to terminate the data forwarding. The S-gNB 105 may transfer one or more end marker packets from the CU-UP 108 of the S-gNB 105 to the CU-UP 108 of the T-gNB 105 to indicate termination of the data forwarding. The one or more end marker packets that are transferred from the CU-UP 108 of the S-gNB 105 to the CU-UP 108 of the T-gNB 105 may be different from the one or more end marker packets received from the UPF (such as at operation 640). For instance, the S-gNB 105 may generate the one or more end marker packets that are transferred from the CU-UP 108 of the S-gNB 105 to the CU-UP 108 of the T-gNB 105.

At operation 650, the S-gNB 105 may refrain from data forwarding to the T-gNB 105. In some embodiments, the S-gNB 105 may refrain from data forwarding from the CU-UP 108 of the S-gNB 105 to a CU-UP 108 of the T-gNB 105. In some embodiments, the S-gNB 105 may refrain from data forwarding to the T-gNB 105 based on reception of the one or more end markers.

At operation 655, the S-gNB 105 may receive an XnAP UE context release message. In some embodiments, the CU-CP 108 of the S-gNB 105 may decode an XnAP UE context release message that indicates that the Xn handover of the UE 102 from the S-gNB 105 to the T-gNB 105 has been completed. In some embodiments, the XnAP UE context release message may be received from the CU-CP 108 of the T-gNB 105.

At operation 660, the S-gNB 105 may transfer an F1AP UE context release message. In some embodiments, the S-gNB 105 may transfer the F1AP UE context release message in response to reception of the XnAP UE context release message. In some embodiments, the S-gNB 105 may encode the F1AP UE context release message for transfer from the CU-CP 107 of the S-gNB 105 to the gNB-DU 109. In some embodiments, the F1AP UE context release message may indicate that the gNB-DU 109 is to release resources previously allocated for the UE 102 before the Xn handover of the UE 102 from the S-gNB 105 to the T-gNB 105.

At operation 665, the S-gNB 105 may transfer an E1AP bearer release message. In some embodiments, the S-gNB 105 may transfer the E1AP bearer release message in response to reception of the XnAP UE context release message. In some embodiments, the S-gNB 105 may encode the E1AP bearer release message for transfer from the CU-CP 107 of the S-gNB 105 to the CU-UP 108 of the S-gNB 105. In some embodiments, the E1AP bearer release message may indicate one or more of: that the CU-UP 108 of the S-gNB 105 is to release one or more data radio bearers (DRBs) between the UE 102 and the gNB-DU 109; that the CU-UP 108 of the S-gNB 105 is to release resources previously allocated for the UE 102 before the Xn handover of the UE 102 from the S-gNB 105 to the T-gNB 105; and/or other information.

In some embodiments, the S-gNB 105 may initiate an E1 interface setup procedure to establish an E1 interface between the CU-UP 108 of the S-gNB 105 and the CU-CP 107 of the S-gNB 105 by sending a GNB-CU-UP E1 setup request message from the CU-UP 108 of the S-gNB 105 to the CU-CP 107 of the S-gNB 105. The S-gNB 105 may encode, for transfer from the CU-CP 107 of the S-gNB 105 to the CU-UP 108 of the S-gNB 105, an E1AP bearer modification message that indicates radio network layer (RNL) information and/or transport network layer (TNL) information to be used by the CU-UP 108 of the S-gNB 105 to forward downlink data packets to the CU-UP 108 of the T-gNB 105.

In some embodiments, the gNB-DU 109 may be configured to host radio-link control (RLC), medium-access control (MAC) and physical (PHY) layers of the S-gNB 105. The gNB-DU 109 may be configured to receive one or more RRC measurement reports from the UE 102 over a user interface (uu).

In some embodiments, the S-gNB may comprise multiple CU-UPs 108 for user-plane functionality. In some embodiments, the CU-CP 107 of the S-gNB 105 may determine whether to perform an intra CU-CP handover of the UE 102 from a first CU-UP 108 of the S-gNB 105 to a second CU-UP 108 of the S-gNB 105. If it is determined that the intra CU-CP handover is to be performed, the S-gNB 105 may refrain from transferring path switch request messages to an access management function (AMF) entity to indicate the intra CU-CP handover. In some embodiments, the AMF may manage network functions for the S-gNB 105. In some embodiments, the AMF may manage network functions for the S-gNB 105 and/or T-gNB 105.

In some embodiments, the gNB 105 may be configurable to operate as a target gNB (T-gNB) 105. The T-gNB 105 may be configured with logical nodes, including a gNB-CU 106 and a gNB-DU 109. The gNB-CU 106 may comprise a CU-UP 107 for control-plane functionality, and a CU-UP 108 for user-plane functionality.

At operation 705, a T-gNB 105 may receive an XnAP handover request message from an S-gNB 105, at the CU-CP of the T-gNB, an XnAP handover request message that indicates an Xn handover of a User Equipment (UE) from a source gNB (S-gNB) to the T-gNB, the XnAP handover request message received from a CU-CP of the S-gNB.

At operation 710, the T-gNB 105 may transfer an XnAP handover request acknowledge message from the S-gNB 105. In some embodiments, the T-gNB 105 may encode, for transfer from the CU-CP 107 of the T-gNB 105 to the CU-CP 107 of the S-gNB 105, an XnAP handover request acknowledgement message that acknowledges the Xn handover of the UE 102 from the S-gNB 105 to the T-gNB 105.

At operation 715, the T-gNB 105 may receive an XnAP sequence number (SN) status transfer message. In some embodiments, the CU-CP 107 of the T-gNB 105 may decode an XnAP sequence number (SN) status transfer message received from the CU-CP 107 of the S-gNB 105. The XnAP SN status transfer message may indicate one or more of: an SN of a last packet data convergence protocol (PDCP) protocol data unit (PDU) successfully received from the UE 102; an SN of a last PDCP PDU transmitted to the UE 102; and/or other information.

At operation 720, the T-gNB 105 may receive data packets forwarded from the S-gNB 105. In some embodiments, the T-gNB 105 may, at the CU-UP 107 of the T-gNB 105, decode downlink data packets intended for the UE 102. The downlink data packets may have been forwarded from the CU-UP 108 of the S-gNB 105.

At operation 725, the T-gNB 105 may transfer a path switch request message to an AMF entity. In some embodiments, the T-gNB 105 may encode, for transfer, from the CU-CP 107 of the T-gNB 105 to an access management function (AMF) entity that manages network functions (NFs) for the S-gNB 105 and the T-gNB 105, a path switch request message that indicates the handover of the UE 102 from the S-gNB 105 to the T-gNB 105.

At operation 730, the T-gNB 105 may receive a path switch request acknowledgement message. In some embodiments, the T-gNB 105 may, at the CU-CP of the T-gNB, decode a path switch request acknowledgement message that acknowledges the path switch request message. The path switch request acknowledgement message may be received from the AMF entity.

At operation 735, the T-gNB 105 may transfer an XnAP UE context release message. In some embodiments, the T-gNB 105 may encode, for transfer from the CU-CP 107 of the T-gNB 105 to the CU-CP 107 of the S-gNB 105, an XnAP UE context release message that indicates that the Xn handover of the UE 102 from the S-gNB 105 to the T-gNB 105 has been completed. In some embodiments, the T-gNB 105 may transfer the XnAP UE context release message in response to reception of the path switch request acknowledgement message, although the scope of embodiments is not limited in this respect.

At operation 740, the T-gNB 105 may monitor for one or more end marker packets. In some embodiments, the T-gNB 105 may, at the CU-UP 108 of the T-gNB 105, monitor for one or more end marker packets from the CU-UP 108 of the S-gNB 105. The end marker packets may indicate that the CU-UP 108 of the S-gNB 105 is to refrain from forwarding, to the CU-UP 108 of the T-gNB 105, of the downlink data packets intended for the UE 102.

Figure 8:
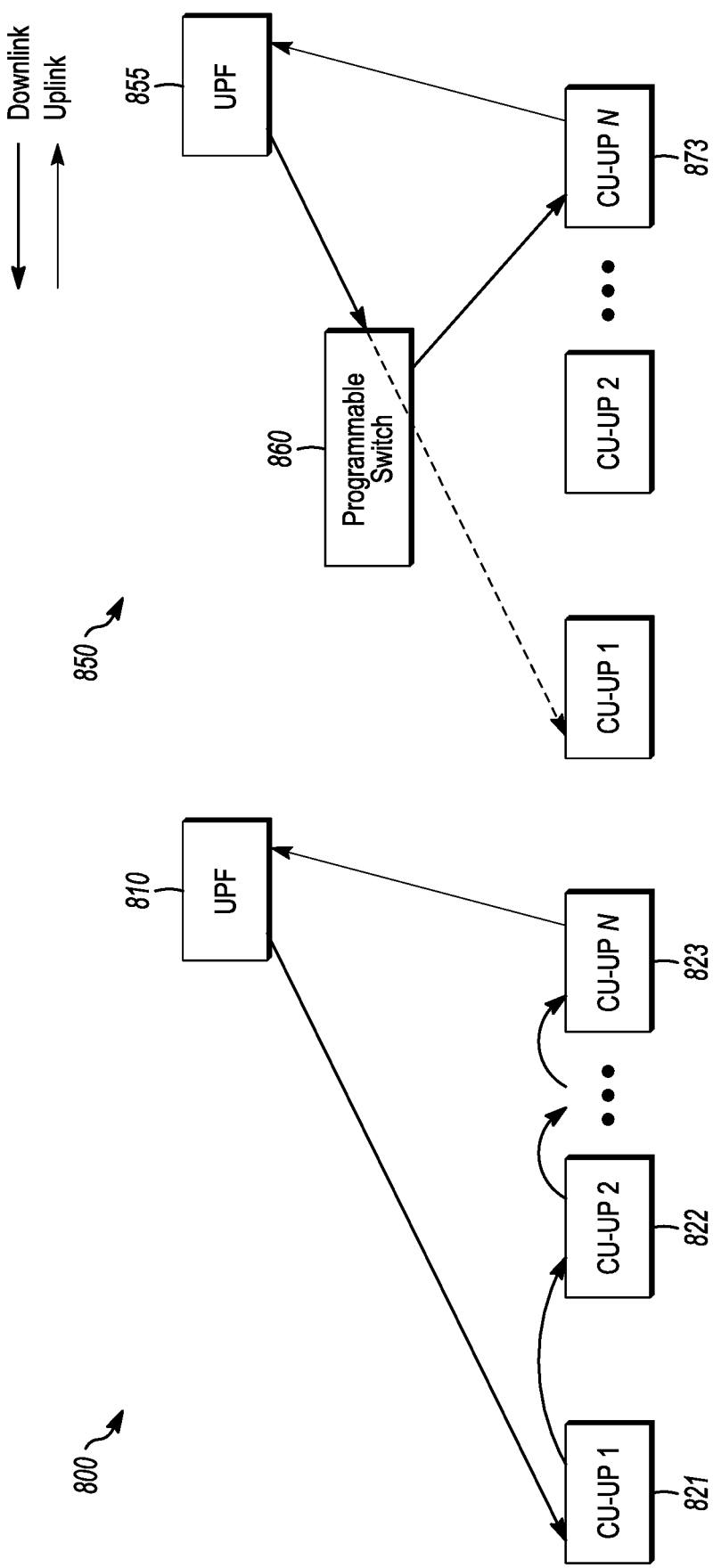
FIG. 8 illustrates examples of data forwarding in accordance with some embodiments.
Figure 9:
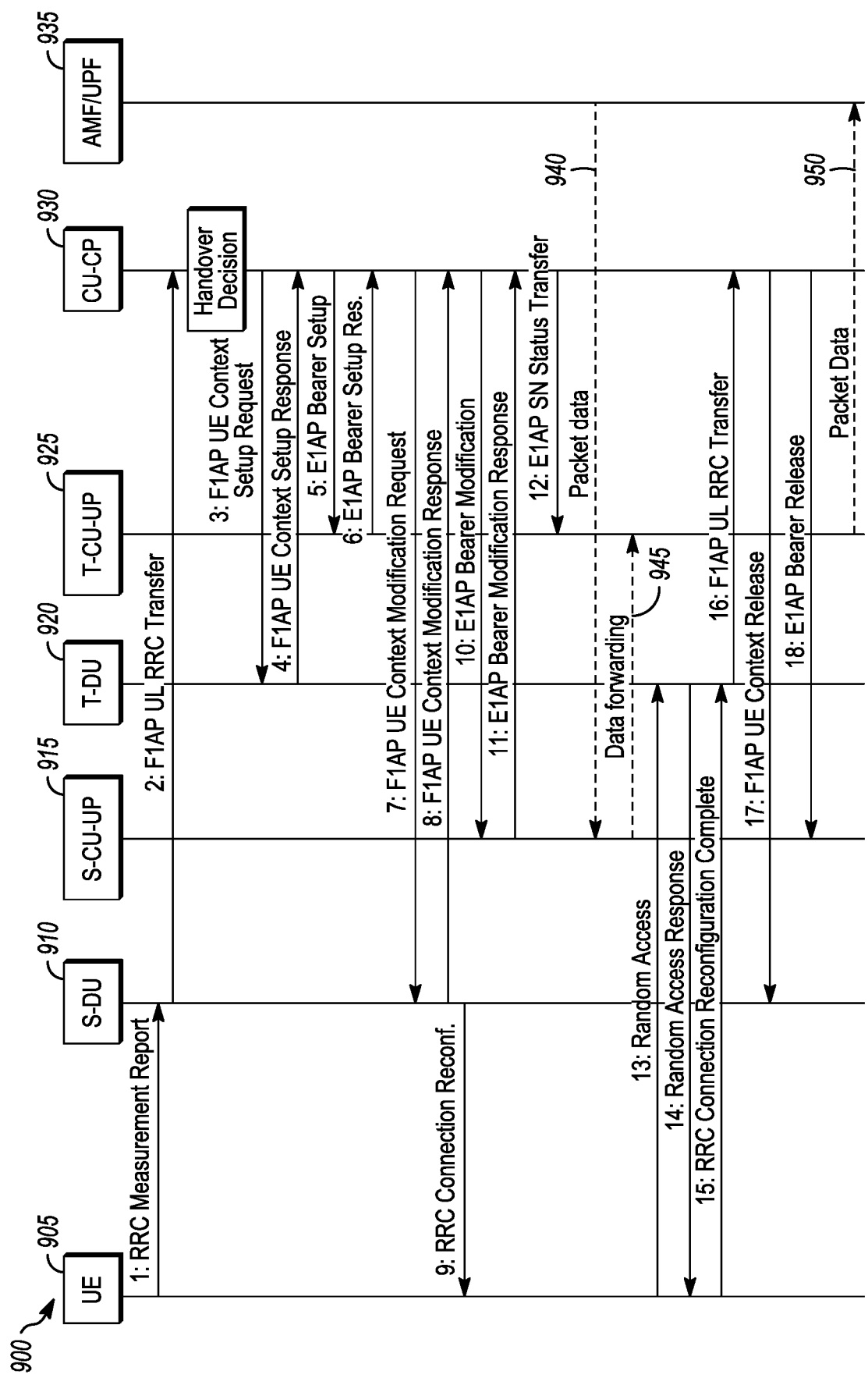
FIG. 9 illustrates example messages and operations in accordance with some embodiments.
Figure 10A:
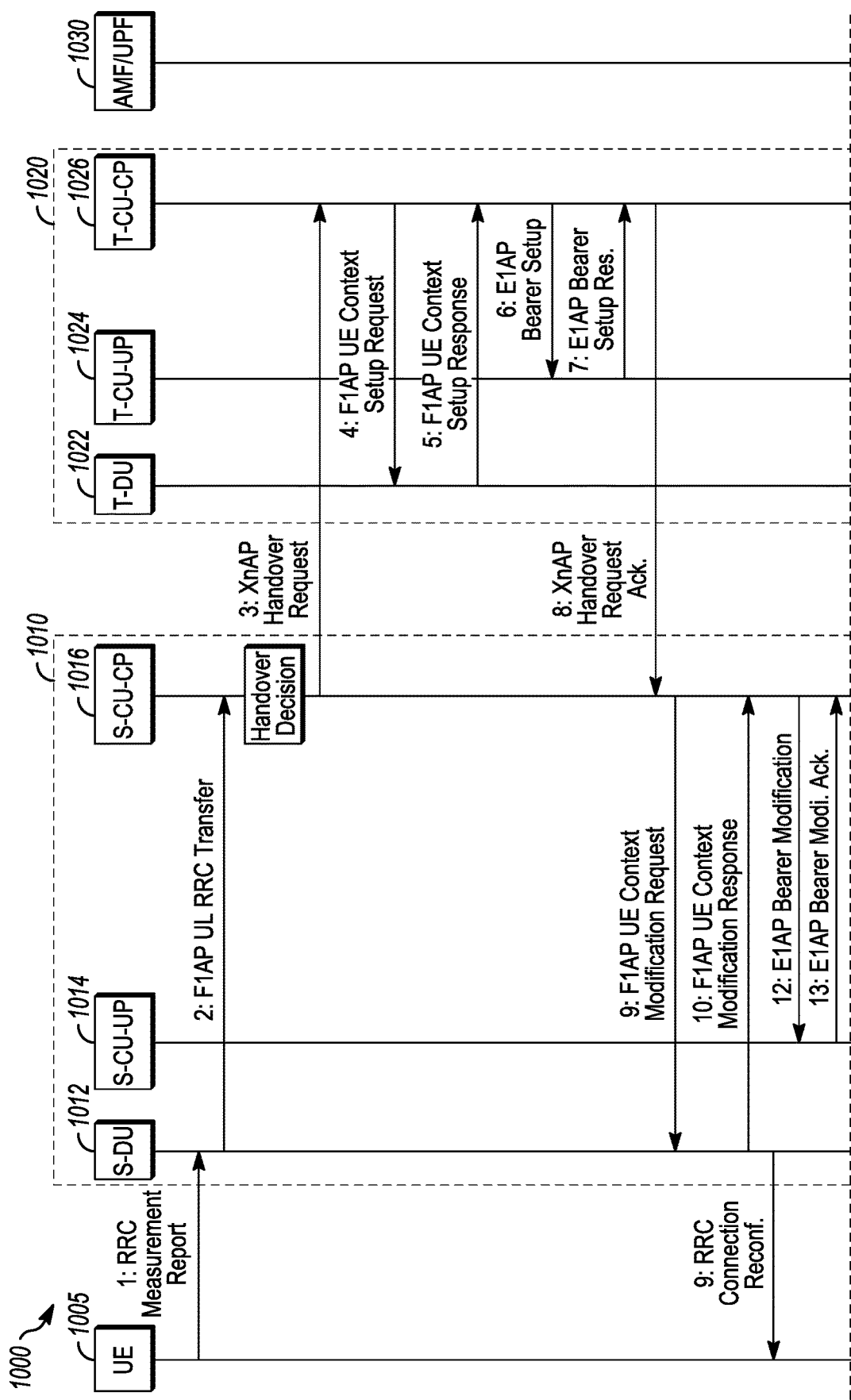
FIG. 10A and FIG. 10B illustrate additional example messages and operations in accordance with some embodiments.
Figure 10B:
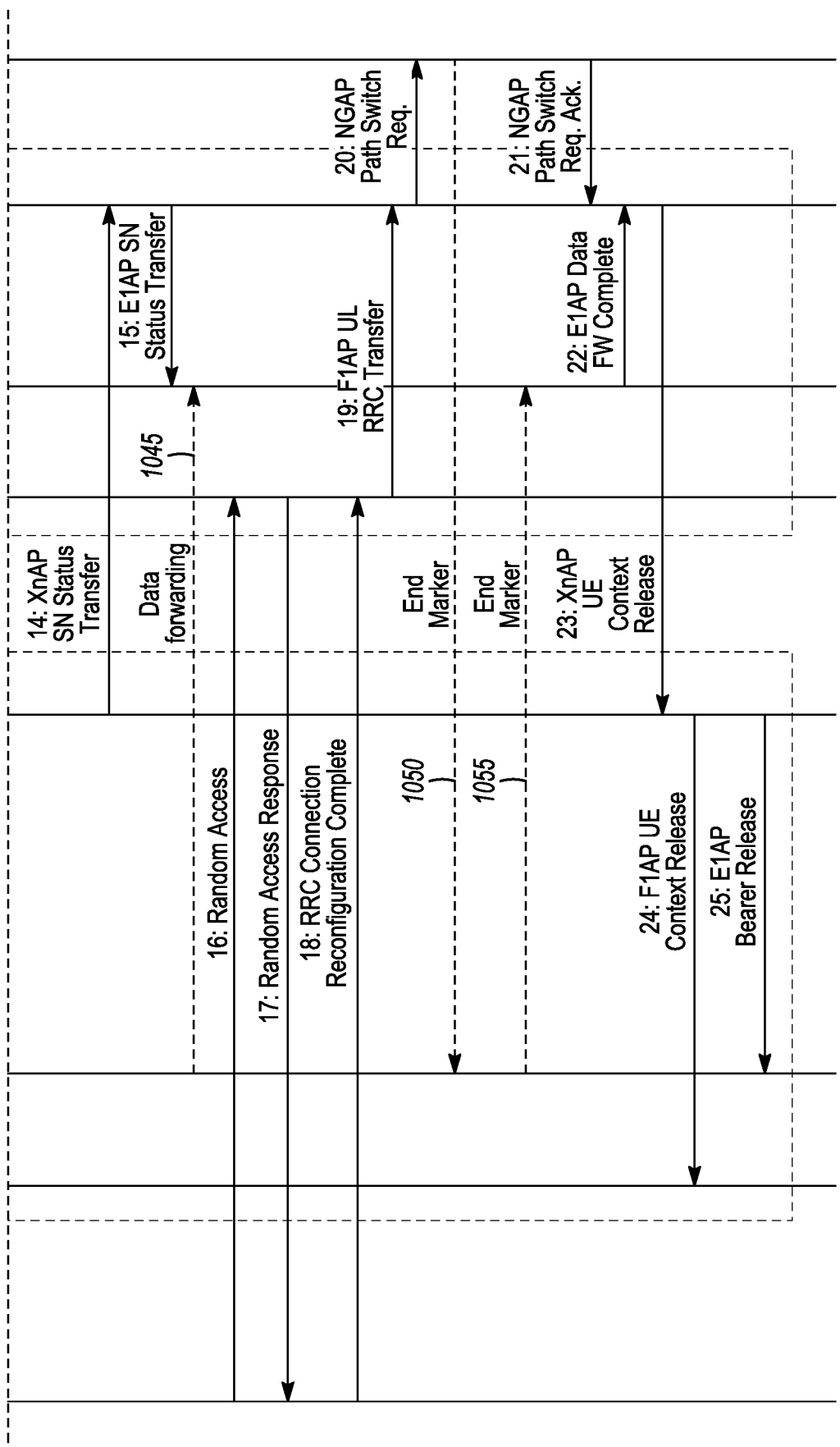

FIG. 8 illustrates examples of data forwarding in accordance with some embodiments. FIG. 9 illustrates example messages and operations in accordance with some embodiments. FIG. 10A and FIG. 10B illustrate additional example messages and operations in accordance with some embodiments. In references herein, "FIG. 10" may include FIG. 10A and FIG. 10B. It should be noted that the examples shown in FIGS. 8-10 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 8-10. Although some of the elements shown in the examples of FIGS. 8-10 may be included in a 3GPP LTE standard, 5G standard, NR standard and/or other standard, embodiments are not limited to usage of such elements that are included in standards.

In some embodiments, a method may include one or more operations shown in one or more of FIGS. 6-10. In some embodiments, a method may include one or more operations shown in any of FIGS. 6-10. In some embodiments, a method may include one or more operations that may be similar to one or more operations shown in FIGS. 6-10. In some embodiments, a method may include one or more operations that may be reciprocal to one or more operations shown in FIGS. 6-10. In some embodiments, a method may include one or more of: one or more operations shown in FIGS. 6-10; one or more operations that are similar to one or more operations shown in FIGS. 6-10; one or more operations that are reciprocal to one or more operations shown in FIGS. 6-10; and/or other operations. In some embodiments, a method may include one or more operations that may not necessarily be illustrated in FIGS. 6-10.

In a non-limiting example, a method may include one or more operations shown in FIG. 6 and may include one or more operations shown in FIG. 9. In another non-limiting example, a method may include one or more operations shown in FIG. 7 and may include one or more operations shown in FIG. 9.

In some embodiments, for an intra CU-CP case, packet forwarding by a chain of CU-UPs 108 or by an intermediate programmable switch under the control of CU-CP 107 may be used. In some cases, such techniques may help to avoid signaling on the NG interface. In some embodiments, a hierarchical mobility management system comprising a CU-CP 107 and an AMF may enable distribution of a signaling load on NG to the internal interface of gNB 105. An AMF/UPF may, in some cases, cover an area comprising multiple CU-CPs 107. Some techniques described herein may help to avoid a signaling storm to the AMF/UPF in some cases, at an affordable cost of data forwarding or signaling between the CU-CP 107 and the programmable switch per CU-CP area.

In some embodiments, for an inter CU-CP case, a completion of data forwarding may be asserted by the targeted CU-UP 108 after reception of one or more End Markers from the source CU-UP 108. Then the target CU-CP 107 may issue a UE Context Release message upon the reception of both a Path Switch Request Acknowledgement message from the AMF and a Data Forward Complete message from the target CU-UP 108. In some cases, this may ensure a consistency at source and target CU-CPs 107.

In some embodiments, some of the techniques described herein may improve one or more of: a signaling efficiency on the NG-C/N2 interface, a control plane flexibility, a consistency and/or a data plane latency for the handover in NG-RAN with separated control plane and user plane.

In some embodiments, an intra CU-CP handover without NG-U path switch may be performed. Although a CU-UP 108 may be relocated during handover, the CU-CP 107 may designate the original CU-UPs 108 or programmable switches as local mobility anchors without issuing Path Switch Request to the AMF. In some cases, signalling on the NG-C interface may therefore be reduced.

In the non-limiting examples 800 and 850 shown in FIG. 8, example downlink/uplink routes are illustrated. It may be assumed, in some cases, that the UE 102 was handed off sequentially from CU-UP 1 to CU-UP N-1 and now is camped on CU-UP N. In the scenario 800 (in which intermediate programmable switches are not deployed), downlink packets that are intended for CU-UP 1 (821) may be forwarded by CU-UP 1 (821), CU-UP 2 (822) and/or other CU-UPs. The downlink packets may reach CU-UP N (823) after such forwarding is performed. Embodiments are not limited to the number of CU-UPs shown in 800. In a non-limiting example, additional CU-UPs indexed between 3 and (N-1) may forward the data packets. The number N may be any suitable value greater than or equal to 2. In another non-limiting example, N may be 3, in which case the data packets may be forwarded from CU-UP 1 (821) to CU-UP 2 (822), and then forwarded from CU-UP 2 (822) to CU-UP N (823). In the scenario 850 (in which the programmable switch 860 is used), downlink packets may be modified and forwarded to CU-UP N (873) directly.

In FIG. 9, an example 900 of an intra CU-CP handover is shown. In some embodiments, the intra CU-CP handover may be performed without an NG-U path switch, although the scope of embodiments is not limited in this respect. In FIG. 9, the dashed lines denote user-plane messages/data and the solid lines denote control-plane messages. It should be noted that embodiments are not limited to the names, types and other aspects of the messages exchanged in FIG. 9. In some embodiments, alternate messages, different messages, similar messages, alternate names, different names and/or similar names may be used.

At Operation #1 of 900, the UE 905 may send an RRC MEASUREMENT REPORT to the S-DU 910. In some embodiments, the event(s) that trigger the measurement report may depend on a measurement configuration of the UE 905.

At operation #2 of 900, the S-DU 910 may use an F1AP UL RRC TRANSFER message to forward the RRC measurement report to the S-CU-CP 915.

At operation #3 of 900, the CU-CP 930 may make a handover decision. The handover decision may be based at least partly on information included in the measurement report, in some embodiments. The CU-CP 930 may send an F1-AP CONTEXT SETUP REQUEST message to T-DU 920. The message may include information such as UE context information, CU-UP-UL-TEID for data radio bearers and/or other information.

At operation #4 of 900, the T-DU 920 may perform one or more of the following: admission control; configuration of lower-layers; creation of a local UE context (which may include a C-RNTI for the UE 905, in some embodiments); and/or other. The T-DU 920 may send the F1-AP CONTEXT SETUP RESPONSE message to the T-CU-CP 925. The message may include one or more of: information related to lower-layers configuration; C-RNTI; DU-DL-TEID; and/or other information.

At operation #5 of 900, the CU-CP 930 may send an E1-AP BEARER SETUP message to T-CU-UP 925. The message may include one or more of: information related to a security configuration; QoS-flows; DRB mapping, and DU-DL-TEID; and/or other information.

At operation #6 of 900, the T-CU-UP 925 may send an E1AP BEARER SETUP RESPONSE message to the T-CU-CP 925.

At operation #7 of 900, the CU-CP 930 may send an F1AP UE CONTEXT MODIFICATION REQUEST message to the S-DU 910. In some embodiments, the F1AP UE CONTEXT MODIFICATION REQUEST message may include a transparent container that carries the RRC message to perform handover, although the scope of embodiments is not limited in this respect. The F1AP UE CONTEXT MODIFICATION REQUEST message may include a specific field value to inform S-DU 910 about the handover.

At operation #8 of 900, the S-DU 910 may send an F1AP UE CONTEXT MODIFICATION RESPONSE message to the CU-CP 930 to confirm that the handover is accepted.

At operation #9 of 900, the S-DU 910 may send an RRC CONNECTION RECONFIGURATION MESSAGE to the UE 905.

At operation #10 of 900, the CU-CP 930 may send an E1AP BEARER MODIFICATION message to the S-CU-UP 915. The E1AP BEARER MODIFICATION message may include the RNL/TNL information for the data forwarding tunnels (if applicable).

At operation #11 of 900, the S-CU-UP 915 may send an E1AP BEARER MODIFICATION ACK message to the CU-CP 930. The message may include one or more of:

uplink PDCP SN receiver status; downlink PDCP SN transmitter status; and/or other information.

At operation #12 of 900, the CU-CP 930 may send an E1AP SN STATUS TRANSFER message to the T-CU-UP 925. The message may indicate one or more of: uplink PDCP SN receiver status; downlink PDCP SN transmitter status; and/or other information. As indicted by 945, data forwarding may start from the S-CU-UP 915 to the T-CU-UP 925 via the Xn-U interface.

At operation #13 of 900, the UE 905 may send a RANDOM ACCESS preamble to the T-DU 920. The UE 905 may employ a dedicated RACH preamble if that was included in the RRC connection reconfiguration message, although the scope of embodiments is not limited in this respect.

At operation #14 of 900, the T-DU 920 may send a RANDOM ACCESS RESPONSE to the UE 905.

At operation #15 of 900, the UE 905 may send an RRC CONNECTION CONFIGURATION COMPLETE message to the T-DU 920. The message may include the C-RNTI to identify the UE 905, in some embodiments.

At operation #16 of 900, the T-DU 920 may use an F1AP UL RRC TRANSFER message to forward the RRC connection reconfiguration complete message to the CU-CP 930.

After reception of the F1AP UL RRC TRANSFER, the CU-CP 930 may send an F1AP UE CONTEXT RELEASE message to the S-DU 910 at operation #17 of 900 and may send an E1AP BEARER RELEASE message to the S-CU-UP 915 at operation #18 of 900. One or more of the messages of operations #17 and #18 may release radio and corresponding resources, in some embodiments.

In some embodiments, because the NG-U path is not changed, the S-CU-UP 915 may not receive an End Marker from the UPF 935 and may continue to forward packets to the T-CU-UP 925. In some embodiments, after handover is completed, the UPF 935 may receive uplink packets from the T-CU-UP 925 and/or may send downlink packets to the S-CU-UP 915. In some embodiments, once the S-CU-UP 915 receives an End Marker from the UPF and has forwarded all packets in its buffer, it may send an End Marker to the T-CU-UP 925. In some embodiments, the T-CU-UP 925 may repeat one or more of the operations performed by the S-CU-UP 915 in cases in which the T-CU-CP 925 is also an intermediate forwarding node.

In some embodiments an Xn (inter CU-CP) handover may be performed. Referring to FIG. 10, a non-limiting example 1000 of an Xn (inter CU-CP) handover is illustrated. In FIG. 10, the dashed lines denote user-plane messages/data and the solid lines denote control-plane messages.

At operation #1 of 1000, the UE 1005 may send an RC MEASUREMENT REPORT to S-DU 1012. In some embodiments, the event(s) that trigger the measurement report may depend on a measurement configuration of the UE 1005.

At operation #2 of 1000, the S-DU 1012 may use an F1AP UL RRC TRANSFER message to forward the RRC measurement report to the S-CU-CP 1016.

At operation #3 of 1000, the S-CU-CP 1016 may make a handover decision. The decision may be based at least partly on the content of the RRC measurement report. The S-gNB (S-CU-CP 1016) may send an XnAP 'HANDOVER REQUEST' message to the T-gNB (T-CU-CP 1026). The message may include information to prepare the handover at the target side.

At operation #4 of 1000, the T-CU-CP 1026 may perform one or more of: admission control; creation of a UE context; identification of the T-DU 1022; selection of the T-CU-UP 1024; and/or other. Then, the T-CU-CP 1026 may send an F1-AP CONTEXT SETUP REQUEST message to the T-DU 1022. The message may include one or more of: UE context information; CU-UP-UL-TEID for data radio bearers; and/or other information.

At operation #5 of 1000, the T-DU 1022 may perform one or more of: admission control; configuration of lower-layers; creation of a local UE context (which may include a C-RNTI for the UE 1005 and/or other information, in some embodiments). Then, the T-DU 1022 may send an F1-AP CONTEXT SETUP RESPONSE message to the T-CU-CP 1026. The message may include one or more of: information related to lower-layer configuration; C-RNTI; DU-DL-TEID for data radio bearers; and/or other information.

At operation #6 of 1000, the T-CU-CP 1026 may send an E1-AP BEARER SETUP message to the T-CU-UP 1024. The message may include information related to one or more of: security configuration; QoS-flows; DRB mapping; DU-DL-TEID; and/or other.

At operation #7 of 1000, the T-CU-UP 1024 may apply the configuration received from the T-CU-CP 1026. Then, the T-CU-UP 1024 may send an E1AP BEARER SETUP RESPONSE message to the T-CU-CP 1026.

At operation #8 of 1000, the T-gNB (T-CU-CP 1026) may send an XnAP HANDOVER REQUEST ACKNOWLEDGE to the S-gNB (S-CU-CP 1016). In some embodiments, the XnAP HANDOVER REQUEST ACKNOWLEDGE message may include a transparent container to be sent to the UE 1005 as an RRC message to perform the handover (which may include a C-RNTI and/or other elements), although the scope of embodiments is not limited in this respect. In some embodiments, the XnAP HANDOVER REQUEST ACKNOWLEDGE message may also include RNL/TNL information for the data forwarding tunnels (if applicable).

At operation #9 of 1000, the S-CU-CP 1016 may send an F1AP UE CONTEXT MODIFICATION REQUEST message to the S-DU 1012. In some embodiments, the F1AP UE CONTEXT MODIFICATION REQUEST message may include a transparent container that carries the RRC message to perform handover, which was generated by the T-CU-CP 1026 and ciphered and integrity protected by the S-CU-CP 1016. In some embodiments, the F1AP UE CONTEXT MODIFICATION REQUEST message may include a specific field value to inform the S-DU 1012 about the handover.

At operation #10 of 1000, the S-DU 1012 may send an F1AP UE CONTEXT MODIFICATION RESPONSE message to the S-CU-CP 1016 to confirm that the handover is accepted.

At operation #11 of 1000, the S-DU 1012 may send an RRC CONNECTION RECONFIGURATION MESSAGE to the UE 1005.

At operation #12 of 1000, the S-CU-CP 1016 may send an E1AP BEARER MODIFICATION message to the S-CU-UP 1014. In some embodiments, the E1AP BEARER MODIFICATION message may include the RNL/TNL information for the data forwarding tunnels (if applicable).

At operation #13 of 1000, the S-CU-UP 1014 may send an E1AP BEARER MODIFICATION ACK message to the S-CU-CP 1016. The message may include one or more of: uplink PDCP SN receiver status; downlink PDCP SN transmitter status; and/or other.

At operation #14 of 1000, the S-gNB (S-CU-CP 1016) may send an XnAP SN STATUS TRANSFER message to the T-gNB (T-CU-CP 1026). The message may indicate one or more of: the uplink PDCP SN receiver status; the downlink PDCP SN transmitter status; and/or other information.

At operation #15 of 1000, the T-CU-CP 1026 may send an E1AP SN STATUS TRANSFER message to the T-CU-UP 1024. The message may indicate one of more of: the uplink PDCP SN receiver status; the downlink PDCP SN transmitter status; and/or other information. Data forwarding may start from the S-CU-UP 1014 to the T-CU-UP 1024 via Xn-U interface.

At operation #16 of 1000, the UE 1005 may send a RANDOM ACCESS preamble to the T-DU 1022. It may employ a dedicated RACH preamble if that was included in the RRC connection reconfiguration message.

At operation #17 of 1000, the T-DU 1022 may send a RANDOM ACCESS RESPONSE to the UE 1005.

At operation #18 of 1000, the UE 1005 may send an RRC CONNECTION CONFIGURATION COMPLETE to the T-DU 1022. The message may include the C-RNTI to identify the UE 1005, in some embodiments.

At operation #19 of 1000, the T-DU 1022 may use an F1AP UL RRC TRANSFER message to forward the RRC connection reconfiguration complete message to the T-CU-CP 1026.

At operation #20 of 1000, the T-gNB (T-CU-CP 1026) may send an NGAP PATH SWITCH REQUEST message to the AMF 1030 to indicate that the UE 1005 has changed cell. The AMF 1030 may then contact the UPF 1030 to modify PDU session, in some embodiments.

In some embodiments, the UPF 1030 may send one or more End Markers to the S-CU-UP 1014 to indicate the termination of downlink packet dispatch. Before receiving the "end marker" packets, the S-CU-UP 1014, if forwarding is applicable, may forward the packets toward the T-CU-UP 1024.

At operation #21 of 1000, the AMF 1030 may confirm the NGAP PATH SWITCH REQUEST message with an NGAP PATH SWITCH REQUEST ACKNOWLEDGE message. The S-CU-UP 1014 may send one or more End Marker to the T-CU-UP 1024 to indicate the completion of packet forwarding.

At operation #22 of 1000, the T-CU-UP 1024 may send an E1AP DATA FORWARD COMPLETE message to the T-CU-CP 1026 after it has received an End Marker from the S-CU-UP 1014. In some embodiments, the T-CU-UP 1024 may send an E1AP DATA FORWARD COMPLETE message to the T-CU-CP 1026 as soon as it has received an End Marker from the S-CU-UP 1014.

At operation #23 of 1000, the T-gNB (T-CU-CP 1026) may send an XnAP UE CONTEXT RELEASE message to the S-gNB (S-CU-CP 1016). The XnAP UE CONTEXT RELEASE message may inform the S-gNB (S-CU-CP 1016) that the handover was successful.

At operation #24 of 1000, the S-CU-CP 1016 may send an F1AP UE CONTEXT RELEASE message to the S-DU 1012. In some embodiments, the message may indicate to the S-DU 1012 to release the resources allocated to the UE 1005.

At operation #25 of 1000, the S-CU-CP 1016 may send an E1AP BEARER RELEASE message to the S-CU-UP 1014 to release the data radio bearers and release the corresponding resources.

In some embodiments, a control plane (CP) of a central unit (CU) of a base station (CU-CP) 107 may receive measurement information relating to a strength of a connectivity of a UE 102. The CU-CP 107 may determine, based on the received measurement information, whether to perform a handover operation.

In some embodiments, when the target user plane (T-CU-CP 107) determined by the handover operation is also affiliated with the same CU-CP 107, an intra CU-CP handover may be performed, wherein the CU-CP 107 may further perform one or more of: determine a target distributed unit (T-DU) 109 to which the UE 102 is to attach after completion of the handover; setup a UE context; configure radio bearers on both T-DU 109 and T-CU-CP 107, without sending messages to the core network (such as the Access & Mobility Function (AMF)) to request path switch.

In some embodiments, when the target user plane (T-CU-CP 107) determined by the handover operation is affiliated with the second CU-CP 107 in the RAN, an inter CU-CP handover may be performed, wherein the CU-CP 107 may further perform one or more of: determine the target CU-CP 107 with which the UE 102 is to be affiliated; communicate with the target CU-CP 107 to switch an affiliation of the UE 102 from the source CU-CP 107 to the target CU-CP 107; and/or other.

In some embodiments, the measure information may be forwarded by a gNB distributed unit (gNB-DU) 109 of the base station. In some embodiments, the CU-CP 107 may transmit Path Switch Request to the AMF during an inter CU-CP handover. In some embodiments, the CU-CP 107 may transmit UE Context Release after having received path switch request acknowledgement from AMF and Data Forward Complete message from the CU-UP 108 that is affiliated with the CU-CP 107. The UE Context Release may indicate that the CU-UP 108 has received one or more End Marker form the peer source CU-UP 108 which has finished forwarding the downlink data received from User Plane Function (UPF).

In some embodiments, the CU-CP 107 may receive a Sequence Number (SN) Status Transfer from the Source CU-CP 107 and may then send it to the CU-UP 108 with which the UE 102 is to be affiliated. In some embodiments, the SN status transfer may include the sequence number of a last successfully received downlink Packet Date Convergence Protocol (PDCP) PDU and transmitted PDCP PDU.

In some embodiments, a user plane (UP) of the central unit (CU) of a base station (CU-UP) 108 may perform one or more of: forward packets received from UPF to a target CU-UP 108 that the UE 102 is to be affiliated with after the completion of handover; receive one or more End Markers form UPF, wherein the End Markers may indicate completion of path switch; send one or more End Markers to the target CU-UP 108 that the UE 102 is to be affiliated with after having received one or more End Marker form UPF; and/or other. In some embodiments, the CU-UP 108 may stop sending packets over the air interface to UE 102, and may instead forward packets to the target CU-UP 108 (after it has received Bearer Modification message from the CU-CP 107 it is affiliated with). In some embodiments, the information in the Bearer Modification message may include Transport Network Layer (TNL) address of the target CU-UP 108 and/or other information. In some embodiments, the End Marker to the target CU-UP 108 may be sent if packets in the buffer have been completely forwarded. In some embodiments, the End Marker to the target CU-UP 108 may be sent only if packets in the buffer have been completely forwarded. In some embodiments, the CU-UP 108 may transmit a Data Forward Complete message to the CU-CP 107 that it is affiliated with after having received one or more End Markers from the source CU-UP 108.

In Example 1, a Next Generation Node-B (gNB) may be configurable to operate as a source gNB (S-gNB). The S-gNB may be configured with logical nodes, including a gNB central unit (gNB-CU) and a gNB distributed unit (gNB-DU). The gNB-CU may comprise a control plane (CU-CP) for control-plane functionality, and a user plane (CU-UP) for user-plane functionality. An apparatus of the gNB may comprise memory. The apparatus may further comprise processing circuitry. The processing circuitry may be configured to encode an XnAP handover request message for transfer by the CU-CP of the S-gNB to a CU-CP of a target gNB (T-gNB). The XnAP handover request message may indicate an Xn handover of a User Equipment (UE) from the S-gNB to the T-gNB. The processing circuitry may be further configured to initiate data forwarding, from the CU-UP of the S-gNB to a CU-UP of the T-gNB, of downlink data packets intended for the UE. The processing circuitry may be further configured to decode, at the CU-UP of the S-gNB a first end marker packet that indicates that the CU-UP of the S-gNB is to terminate the data forwarding. The first end marker packet may be received from a user plane function (UPF) entity that exchanges data with the S-gNB. The processing circuitry may be further configured to encode, for transfer from the CU-UP of the S-gNB to the CU-UP of the T-gNB, a second end marker packet that indicates termination of the data forwarding. The memory may be configured to store at least a portion of the XnAP handover request message.

In Example 2, the subject matter of Example 1, wherein the processing circuitry may be further configured to decode, at the CU-CP of the S-gNB, an XnAP UE context release message that indicates that the Xn handover of the UE from the S-gNB to the T-gNB has been completed. The XnAP UE context release message may be received from the CU-CP of the T-gNB.

In Example 3, the subject matter of one or any combination of Examples 1-2, wherein the processing circuitry may be further configured to, in response to reception of the XnAP UE context release message: encode, for transfer from the CU-CP of the S-gNB to the gNB-DU, an F1AP UE context release message that indicates that the gNB-DU is to release resources previously allocated for the UE before the Xn handover of the UE from the S-gNB to the T-gNB.

In Example 4, the subject matter of one or any combination of Examples 1-3, wherein the processing circuitry may be further configured to, in response to reception of the XnAP UE context release message: encode, for transfer from the CU-CP of the S-gNB to the CU-UP of the S-gNB, an E1AP bearer release message. The E1AP bearer release message may indicate: that the CU-UP of the S-gNB is to release one or more data radio bearers (DRBs) between the UE and the gNB-DU, and that the CU-UP of the S-gNB is to release resources previously allocated for the UE before the Xn handover of the UE from the S-gNB to the T-gNB.

In Example 5, the subject matter of one or any combination of Examples 1-4, wherein the processing circuitry may be further configured to decode, at the CU-CP of the S-gNB, a radio resource control (RRC) measurement report from the gNB-DU that includes information related to a signal quality measurement at the UE. The processing circuitry may be further configured to determine, at the CU-CP of the S-gNB, based on the RRC measurement report, whether to initiate the Xn handover of the UE from the S-gNB to the T-gNB.

In Example 6, the subject matter of one or any combination of Examples 1-5, wherein the processing circuitry may be further configured to decode, at the CU-CP of the S-gNB, an XnAP handover request acknowledgement message that acknowledges the Xn handover of the UE from the S-gNB to the T-gNB. The XnAP handover request acknowledgement message may be received from the CU-CP of the T-gNB.

In Example 7, the subject matter of one or any combination of Examples 1-6, wherein the processing circuitry may be further configured to, in response to reception of the XnAP handover request acknowledgement message: encode, for transfer from the CU-CP of the S-gNB to the CU-CP of the T-gNB, an XnAP sequence number (SN) status transfer message. The XnAP SN status transfer message may indicate: an SN of a last packet data convergence protocol (PDCP) protocol data unit (PDU) successfully received from the UE, and an SN of a last PDCP PDU transmitted to the UE.

In Example 8, the subject matter of one or any combination of Examples 1-7, wherein the processing circuitry may be further configured to initiate an E1 interface setup procedure to establish an E1 interface between the CU-UP of the S-gNB and the CU-CP of the S-gNB by sending a GNB-CU-UP E1 setup request message from the CU-UP of the S-gNB to the CU-CP of the S-gNB. The processing circuitry may be further configured to encode, for transfer from the CU-CP of the S-gNB to the CU-UP of the S-gNB, an E1AP bearer modification message that indicates radio network layer (RNL) information and/or transport network layer (TNL) information to be used by the CU-UP of the S-gNB to forward the downlink data packets to the CU-UP of the T-gNB.

In Example 9, the subject matter of one or any combination of Examples 1-8, wherein the gNB-DU may be configured to host radio-link control (RLC), medium-access control (MAC) and physical (PHY) layers of the gNB. The gNB-DU may be configured to receive the RRC measurement report from the UE over a user interface (uu).

In Example 10, the subject matter of one or any combination of Examples 1-9, wherein the CU-UP is a first CU-UP, and the gNB-CU further comprises a second CU-UP for user-plane functionality. The processing circuitry may be further configured to determine, at the CU-CP of the S-gNB, whether to perform an intra CU-CP handover of the UE from the first CU-UP to the second CU-UP. The processing circuitry may be further configured to, if it is determined that the intra CU-CP handover is to be performed, refrain from transferring path switch request messages to the AMF entity to indicate the intra CU-CP handover.

In Example 11, the subject matter of one or any combination of Examples 1-10, wherein the apparatus may include an interface to transfer the XnAP handover request message. The processing circuitry may include a baseband processor to decode the first end marker packet.

In Example 12, a non-transitory computer-readable storage medium may store instructions for execution by processing circuitry of a Next Generation Node-B (gNB). The gNB may be configurable to operate as a source gNB (S-gNB). The S-gNB may be configured with logical nodes including a gNB central unit (gNB-CU) and a gNB distributed unit (gNB-DU). The gNB-CU may comprise a control plane (CU-CP) for control-plane functionality, and a user plane (CU-UP) for user-plane functionality. The operations may configure the processing circuitry to encode, for transfer from the CU-CP of the S-gNB to a CU-CP of a target gNB (T-gNB), an XnAP handover request message that indicates an Xn handover of a User Equipment (UE) from the S-gNB to the T-gNB. The operations may further configure the processing circuitry to decode, at the CU-CP of the S-gNB, an XnAP handover request acknowledgement message that acknowledges the Xn handover of the UE from the S-gNB to the T-gNB. The XnAP handover request acknowledgement message may be received from the CU-CP of the T-gNB. The operations may further configure the processing circuitry to, in response to reception of the XnAP handover request acknowledgement message: decode, at the CU-UP of the S-gNB, one or more end marker packets that indicate that the S-gNB is to refrain from forwarding, from the CU-UP of the S-gNB to a CU-UP of the T-gNB, downlink data packets intended for the UE. The one or more end marker packets may be received from a user plane function (UPF) entity that exchanges data with the S-gNB and the T-gNB.

In Example 13, the subject matter of Example 12, wherein the one or more end marker packets are first one or more end marker packets. The operations may further configure the processing circuitry to before reception of the first one or more end marker packets: forward, from the CU-UP of the S-gNB to the CU-UP of the T-gNB, the downlink data packets intended for the UE. The operations may further configure the processing circuitry to, after the reception of the first one or more end marker packets: encode, for transfer from the CU-UP of the S-gNB to the CU-UP of the T-gNB, second one or more end marker packets that indicate that the S-gNB will refrain from forwarding, from the CU-UP of the S-gNB to the CU-UP of the T-gNB, of the downlink data packets intended for the UE.

In Example 14, the subject matter of one or any combination of Examples 12-13, wherein the operations may further configure the processing circuitry to decode, at the CU-CP of the S-gNB, an XnAP UE context release message that indicates that the Xn handover of the UE from the S-gNB to the T-gNB has been completed, the XnAP UE context release message received from the CU-CP of the T-gNB.

In Example 15, the subject matter of one or any combination of Examples 12-14, wherein the operations may further configure the processing circuitry to, in response to reception of the XnAP UE context release message: encode, for transfer from the CU-CP of the S-gNB to the gNB-DU, an F1AP UE context release message that indicates that the gNB-DU is to release resources previously allocated for the UE before the Xn handover of the UE from the S-gNB to the T-gNB. The operations may further configure the processing circuitry to, in response to reception of the XnAP UE context release message: encode, for transfer from the CU-CP of the S-gNB to the CU-UP of the S-gNB, an E1AP bearer release message that indicates: that the CU-UP of the S-gNB is to release one or more data radio bearers (DRBs) between the UE and the gNB-DU, and that the CU-UP of the S-gNB is to release that indicates that the gNB-DU is to release the resources previously allocated for the UE before the Xn handover of the UE from the S-gNB to the T-gNB.

In Example 16, a non-transitory computer-readable storage medium may store instructions for execution by processing circuitry of a Next Generation Node-B (gNB). The gNB may be configurable to operate as a target gNB. The T-gNB may be configured with logical nodes including a gNB central unit (gNB-CU) and a gNB distributed unit (gNB-DU). The gNB-CU may comprise a control plane (CU-CP) for control-plane functionality, and a user plane (CU-UP) for user-plane functionality. The operations may configure the processing circuitry to decode, at the CU-CP of the T-gNB, an XnAP handover request message that indicates an Xn handover of a User Equipment (UE) from a source gNB (S-gNB) to the T-gNB. The XnAP handover request message may be received from a CU-CP of the S-gNB. The operations may further configure the processing circuitry to decode, at the CU-UP of the T-gNB, downlink data packets intended for the UE, the downlink data packets forwarded from the CU-UP of the S-gNB. The operations may further configure the processing circuitry to monitor, at the CU-UP of the T-gNB, for one or more end marker packets from the CU-UP of the S-gNB that indicate that the CU-UP of the S-gNB is to refrain from forwarding, to the CU-UP of the T-gNB, of the downlink data packets intended for the UE.

In Example 17, the subject matter of Example 16, wherein the operations may further configure the processing circuitry to encode, for transfer, from the CU-CP of the T-gNB to an access management function (AMF) entity that manages network functions (NFs) for the S-gNB and the T-gNB, a path switch request message that indicates the handover of the UE from the S-gNB to the T-gNB. The operations may further configure the processing circuitry to decode, at the CU-CP of the T-gNB, a path switch request acknowledgement message that acknowledges the path switch request message. The path switch request acknowledgement message may be received from the AMF entity.

In Example 18, the subject matter of one or any combination of Examples 16-17, wherein the operations may further configure the processing circuitry to, in response to reception of the path switch request acknowledgement message: transfer, from the CU-CP of the T-gNB to the CU-CP of the S-gNB, an XnAP UE context release message that indicates that the Xn handover of the UE from the S-gNB to the T-gNB has been completed.

In Example 19, the subject matter of one or any combination of Examples 16-18, wherein the operations may further configure the processing circuitry to encode, for transfer from the CU-CP of the T-gNB to the CU-CP of the S-gNB, an XnAP handover request acknowledgement message that acknowledges the Xn handover of the UE from the S-gNB to the T-gNB.

In Example 20, the subject matter of one or any combination of Examples 16-19, wherein the operations may further configure the processing circuitry to decode, at the CU-CP of the T-gNB, an XnAP sequence number (SN) status transfer message received from the CU-CP of the S-gNB. The XnAP SN status transfer message may indicate: an SN of a last packet data convergence protocol (PDCP) protocol data unit (PDU) successfully received from the UE, and an SN of a last PDCP PDU transmitted to the UE.

In Example 21, a Next Generation Node-B (gNB) may be configurable to operate as a source gNB (S-gNB). The S-gNB may be configured with logical nodes including a gNB central unit (gNB-CU) and a gNB distributed unit (gNB-DU). The gNB-CU may comprise a control plane (CU-CP) for control-plane functionality, and a user plane (CU-UP) for user-plane functionality. An apparatus of the S-gNB may comprise means for encoding, for transfer from the CU-CP of the S-gNB to a CU-CP of a target gNB (T-gNB), an XnAP handover request message that indicates an Xn handover of a User Equipment (UE) from the S-gNB to the T-gNB. The apparatus may further comprise means for decoding, at the CU-CP of the S-gNB, an XnAP handover request acknowledgement message that acknowledges the Xn handover of the UE from the S-gNB to the T-gNB. The XnAP handover request acknowledgement message may be received from the CU-CP of the T-gNB. The apparatus may further comprise means for, in response to reception of the XnAP handover request acknowledgement message: decoding, at the CU-UP of the S-gNB, one or more end marker packets that indicate that the S-gNB is to refrain from forwarding, from the CU-UP of the S-gNB to a CU-UP of the T-gNB, downlink data packets intended for the UE. The one or more end marker packets may be received from a user plane function (UPF) entity that exchanges data with the S-gNB and the T-gNB.

In Example 22, the subject matter of Example 21, wherein the one or more end marker packets are first one or more end marker packets. The apparatus may further comprise means for, before reception of the first one or more end marker packets: forwarding, from the CU-UP of the S-gNB to the CU-UP of the T-gNB, the downlink data packets intended for the UE. The apparatus may further comprise means for, after the reception of the first one or more end marker packets: encoding, for transfer from the CU-UP of the S-gNB to the CU-UP of the T-gNB, second one or more end marker packets that indicate that the S-gNB will refrain from forwarding, from the CU-UP of the S-gNB to the CU-UP of the T-gNB, of the downlink data packets intended for the UE.

In Example 23, the subject matter of one or any combination of Examples 21-22, wherein the apparatus may further comprise means for decoding, at the CU-CP of the S-gNB, an XnAP UE context release message that indicates that the Xn handover of the UE from the S-gNB to the T-gNB has been completed. The XnAP UE context release message may be received from the CU-CP of the T-gNB.

In Example 24, the subject matter of one or any combination of Examples 21-23, wherein the apparatus may further comprise means for, in response to reception of the XnAP UE context release message: encoding, for transfer from the CU-CP of the S-gNB to the gNB-DU, an F1AP UE context release message that indicates that the gNB-DU is to release resources previously allocated for the UE before the Xn handover of the UE from the S-gNB to the T-gNB. The apparatus may further comprise means for, in response to reception of the XnAP UE context release message: encoding, for transfer from the CU-CP of the S-gNB to the CU-UP of the S-gNB, an E1AP bearer release message that indicates: that the CU-UP of the S-gNB is to release one or more data radio bearers (DRBs) between the UE and the gNB-DU, and that the CU-UP of the S-gNB is to release that indicates that the gNB-DU is to release the resources previously allocated for the UE before the Xn handover of the UE from the S-gNB to the T-gNB.

In Example 25, a Next Generation Node-B (gNB) may be configurable to operate as a target gNB. The T-gNB may be configured with logical nodes including a gNB central unit (gNB-CU) and a gNB distributed unit (gNB-DU). The gNB-CU may comprise a control plane (CU-CP) for control-plane functionality, and a user plane (CU-UP) for user-plane functionality. An apparatus of the T-gNB may comprise means for decoding, at the CU-CP of the T-gNB, an XnAP handover request message that indicates an Xn handover of a User Equipment (UE) from a source gNB (S-gNB) to the T-gNB. The XnAP handover request message may be received from a CU-CP of the S-gNB. The apparatus may further comprise means for decoding, at the CU-UP of the T-gNB, downlink data packets intended for the UE. The downlink data packets may be forwarded from the CU-UP of the S-gNB. The apparatus may further comprise means for monitoring, at the CU-UP of the T-gNB, for one or more end marker packets from the CU-UP of the S-gNB that indicate that the CU-UP of the S-gNB is to refrain from forwarding, to the CU-UP of the T-gNB, of the downlink data packets intended for the UE.

In Example 26, the subject matter of Example 25, wherein the apparatus may further comprise means for encoding, for transfer, from the CU-CP of the T-gNB to an access management function (AMF) entity that manages network functions (NFs) for the S-gNB and the T-gNB, a path switch request message that indicates the handover of the UE from the S-gNB to the T-gNB. The apparatus may further comprise means for decoding, at the CU-CP of the T-gNB, a path switch request acknowledgement message that acknowledges the path switch request message. The path switch request acknowledgement message may be received from the AMF entity.

In Example 27, the subject matter of one or any combination of Examples 25-26, wherein the apparatus may further comprise means for, in response to reception of the path switch request acknowledgement message: transferring, from the CU-CP of the T-gNB to the CU-CP of the S-gNB, an XnAP UE context release message that indicates that the Xn handover of the UE from the S-gNB to the T-gNB has been completed.

In Example 28, the subject matter of one or any combination of Examples 25-27, wherein the apparatus may further comprise means for encoding, for transfer from the CU-CP of the T-gNB to the CU-CP of the S-gNB, an XnAP handover request acknowledgement message that acknowledges the Xn handover of the UE from the S-gNB to the T-gNB.

In Example 29, the subject matter of one or any combination of Examples 25-28, wherein the apparatus may further comprise means for decoding, at the CU-CP of the T-gNB, an XnAP sequence number (SN) status transfer message received from the CU-CP of the S-gNB. The XnAP SN status transfer message may indicate: an SN of a last packet data convergence protocol (PDCP) protocol data unit (PDU) successfully received from the UE, and an SN of a last PDCP PDU transmitted to the UE.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A base station, comprising:
 a memory; and
 a processor in communication with the memory, wherein the processor is configured to:
  operate the base station as a source base station configured with logical nodes including a first central unit (CU) and a first distributed unit (DU), wherein the first CU include a first control plane (CU-CP) for control plane functionality and a first user plane (CU-UP) for user plane functionality;
  encode an XnAP handover request message for transfer by the first CU-CP to a second CU-CP, wherein the second CU-CP is included in a target base station, wherein the target base station is configured with logical nodes including a second DU and a second CU, wherein the second CU includes the second CU-CP and a second CU-UP;
  initiate, before a user equipment (UE) executes a handover, data forwarding from the first CU-UP to the second CU-UP of downlink data packets intended for the UE; and
  decode, at the first CU-UP, a first end marker packet that indicates that the first CU-UP is to terminate the data forwarding, wherein the first end marker packet is received from a user plane function (UPF) entity that exchanges data with the base station; and encode, for transfer from the first CU-UP to the second CU-UP, a second end marker packet that indicates termination of the data forwarding.

2. The base station of claim 1,
wherein the XnAP handover request message indicates an Xn handover of the UE from the base station to the target base station.

3. The base station of claim 1,
wherein the second end marker packet is the first end marker packet forwarded.

4. The base station of claim 1,
wherein the second end marker packet is based on the first end marker packet.

5. The base station of claim 1,
wherein the first CU-UP initiates the data forwarding before the UE performs a random access procedure with the second DU.

6. The base station of claim 1,
wherein the processor is further configured to:
decode, at the first CU-CP, an XnAP UE context release message that indicates that the Xn handover of the UE from the base station to the target base station has been completed.

7. The base station of claim 6,
wherein XnAP UE context release message is received from the second CU-CP.

8. The base station of claim 6,
wherein the processor is further configured to:
in response to reception of the XnAP UE context release message, encode, for transfer from the first CU-CP to the first DU, an F1AP UE context release message that indicates that the first DU is to release resources previously allocated for the UE before the Xn handover of the UE from the base station to the target base station.

9. The base station of claim 8,
wherein the processor is further configured to:
in response to reception of the XnAP UE context release message,
encode, for transfer from the first CU-CP to the second CU-UP, an E1AP bearer release message that indicates that the first CU-UP is to release one or more data radio bearers (DRBs) between the UE and the first DU and that the first CU-UP of the is to release resources previously allocated for the UE before the Xn handover of the UE from the base station to the target base station.

10. The base station of claim 1,
wherein the processor is further configured to:
decode, at the first CU-CP, a radio resource control (RRC) measurement report from the first DU that includes information related to a signal quality measurement at the UE; and
determine, at the first CU-CP, based on the RRC measurement report, whether to initiate the Xn handover of the UE from the base station to the target base station.

11. An apparatus, comprising
a memory; and
a processor in communication with the memory, wherein the processor is configured to:
operate a base station as a source base station configured with logical nodes including a first central unit (CU) and a first distributed unit (DU), wherein the first CU includes a first control plane (CU-CP) for control plane functionality and a first user plane (CU-UP) for user plane functionality;

encode an XnAP handover request message for transfer by the first CU-CP to a second CU-CP, wherein the second CU-CP is included in a target base station, wherein the target base station is configured with logical nodes including a second DU and a second CU, wherein the second CU includes the second CU-CP and a second CU-UP;

initiate, before a user equipment (UE) executes a handover, data forwarding from the first CU-UP to the second CU-UP of downlink data packets intended for the UE;

decode, at the first CU-UP, a first end marker packet that indicates that the first CU-UP is to terminate the data forwarding, wherein the first end marker packet is received from a user plane function (UPF) entity that exchanges data with the source base station; and encode, for transfer from the first CU-UP to the second CU-UP, a second end marker packet that indicates termination of the data forwarding.

12. The apparatus of claim 11,
wherein the XnAP handover request message indicates an Xn handover of the UE from the base station to the target base station.

13. The apparatus of claim 11,
wherein the second end marker packet is the first end marker packet forwarded.

14. The apparatus of claim 11,
wherein the second end marker packet is based on the first end marker packet.

15. The apparatus of claim 11,
wherein the processor is further configured to:
decode, at the first CU-CP, an XnAP handover request acknowledgement message that acknowledges the Xn handover of the UE from the base station to the target base station, the XnAP handover request acknowledgement message received from the second CU-UP.

16. The apparatus of claim 15,
wherein the processor is further configured to:
in response to reception of the XnAP handover request acknowledgement message, encode, for transfer from the first CU-CP to the second CU-UP, an XnAP sequence number (SN) status transfer message that indicates an SN of a last packet data convergence protocol (PDCP) protocol data unit (PDU) successfully received from the UE and an SN of a last PDCP PDU transmitted to the UE.

17. A non-transitory computer-readable storage medium that stores instructions executable by processing circuitry of a base station to:
operate the base station as a source base station configured with logical nodes including a first central unit (CU) and a first distributed unit (DU), wherein the first CU include a first control plane (CU-CP) for control plane functionality and a first user plane (CU-UP) for user plane functionality;

encode an XnAP handover request message for transfer by the first CU-CP to a second CU-CP, wherein the second CU-CP is included in a target base station, wherein the target base station is configured with logical nodes including a second DU and a second CU, wherein the second CU includes the second CU-CP and a second CU-UP;

initiate, before a user equipment (UE) executes a handover, data forwarding from the first CU-UP to the second CU-UP of downlink data packets intended for the UE; and decode, at the first CU-UP, a first end marker packet that indicates that the first CU-UP is to terminate the data forwarding, wherein the first end marker packet is received from a user plane function (UPF) entity that exchanges data with the base station; and encode, for transfer from the first CU-UP to the second CU-UP, a second end marker packet that indicates termination of the data forwarding.

18. The non-transitory computer-readable storage medium of claim 17,
wherein the XnAP handover request message indicates an Xn handover of the UE from the base station to the target base station.

19. The non-transitory computer-readable storage medium of claim 17,
wherein the second end marker packet is the first end marker packet forwarded.

20. The non-transitory computer-readable storage medium of claim 17,
wherein the second end marker packet is based on the first end marker packet.

* * * * *